(12) United States Patent
Shin

(10) Patent No.: US 11,899,730 B2
(45) Date of Patent: Feb. 13, 2024

(54) SYSTEM AND METHOD FOR MANAGING RELATIONSHIPS, ORGANIZATION, RETRIEVAL, AND SHARING OF DIFFERENT TYPES OF CONTENTS ACCESSIBLE BY A COMPUTING DEVICE

(71) Applicant: SGS Ventures Inc., Guttenberg, NJ (US)

(72) Inventor: Sang G. Shin, Guttenberg, NJ (US)

(73) Assignee: SGS Ventures Inc., Guttenberg, NJ (US)

( * ) Notice: Subject to any disclaimer, the term of this patent is extended or adjusted under 35 U.S.C. 154(b) by 0 days.

(21) Appl. No.: 17/867,932

(22) Filed: Jul. 19, 2022

(65) Prior Publication Data

US 2023/0409656 A1    Dec. 21, 2023

Related U.S. Application Data

(60) Provisional application No. 63/343,740, filed on May 19, 2022.

(51) Int. Cl.
| | |
|---|---|
| *G06F 16/955* | (2019.01) |
| *G06F 16/958* | (2019.01) |
| *G06F 16/954* | (2019.01) |
| *G06F 16/907* | (2019.01) |
| *H04L 67/50* | (2022.01) |
| *G06F 16/58* | (2019.01) |
| *G06F 16/53* | (2019.01) |

(52) U.S. Cl.
CPC ............ *G06F 16/955* (2019.01); *G06F 16/53* (2019.01); *G06F 16/5866* (2019.01); *G06F 16/907* (2019.01); *G06F 16/954* (2019.01); *G06F 16/958* (2019.01); *H04L 67/50* (2022.05); *H04L 67/535* (2022.05)

(58) Field of Classification Search
CPC .... G06F 16/955; G06F 16/53; G06F 16/5866; G06F 16/907; G06F 16/954; G06F 16/958; H04L 67/50; H04L 67/535
See application file for complete search history.

(56) References Cited

U.S. PATENT DOCUMENTS

| | | | |
|---|---|---|---|
| 6,012,069 A * | 1/2000 | Shibazaki | G06F 16/58 707/999.005 |
| 8,510,303 B2 | 8/2013 | Soroushian et al. | |
| 8,745,162 B2 | 6/2014 | Weber et al. | |

(Continued)

FOREIGN PATENT DOCUMENTS

KR    10-2012-0012774 A    2/2012

OTHER PUBLICATIONS

International Search Report and Written Opinion issued in PCT/US2023/022209 dated Aug. 4, 2023.

*Primary Examiner* — Ramy M Osman
(74) *Attorney, Agent, or Firm* — Hoffmann & Baron, LLP

(57) ABSTRACT

Provided are a system and method associated with managing contents using a computing device, wherein the method includes accessing a content entry from a content source; adding at least one of a tag, a memo, or a contact for association with the content entry; posting the at least one of the tag, the memo, or the contact in association with a link to the content entry, as a record associated with the computing device in a database; and displaying the content entry accessed in association with the at least one of the tag, the memo, or the contact as posted.

30 Claims, 19 Drawing Sheets

(56) References Cited

U.S. PATENT DOCUMENTS

| | | |
|---|---|---|
| 8,810,684 B2 | 8/2014 | Chang |
| 9,430,587 B2* | 8/2016 | van der Meulen .... G06Q 10/06 |
| 9,756,094 B1* | 9/2017 | Lewis ................... H04L 65/612 |
| 9,977,570 B2 | 5/2018 | Stallings et al. |
| 10,176,201 B2 | 1/2019 | Johnson |
| 10,296,536 B2* | 5/2019 | Zuckerberg ........... H04L 67/306 |
| 11,392,632 B1* | 7/2022 | Nelson .................. G06F 16/438 |
| 11,429,657 B2* | 8/2022 | Brackett ................. H04L 67/52 |
| 2007/0061487 A1 | 3/2007 | Moore et al. |
| 2008/0189336 A1 | 8/2008 | Prihodko |
| 2008/0256443 A1* | 10/2008 | Li ....................... G06F 16/9535 |
| | | 715/700 |
| 2008/0263014 A1 | 10/2008 | Garijo et al. |
| 2009/0215486 A1* | 8/2009 | Batni ...................... H04L 51/48 |
| | | 455/550.1 |
| 2010/0042717 A1 | 2/2010 | Strandell et al. |
| 2010/0094818 A1* | 4/2010 | Farrell ................... G06Q 30/00 |
| | | 707/E17.014 |
| 2010/0318510 A1* | 12/2010 | Ryu ........................ G06F 16/58 |
| | | 707/E17.019 |
| 2011/0055713 A1* | 3/2011 | Gruenewald .......... G06Q 10/00 |
| | | 709/217 |
| 2012/0271957 A1* | 10/2012 | Carney ................... H04L 51/56 |
| | | 709/228 |
| 2013/0204866 A1* | 8/2013 | Fork ..................... G06F 16/532 |
| | | 707/723 |
| 2014/0181089 A1* | 6/2014 | Desmond .............. G06F 16/901 |
| | | 707/722 |
| 2014/0359505 A1* | 12/2014 | Cisler ................... G06F 16/168 |
| | | 715/810 |
| 2014/0372467 A1* | 12/2014 | Locker ............. G06F 16/24575 |
| | | 707/766 |
| 2015/0100578 A1* | 4/2015 | Rosen ................ G06Q 10/1093 |
| | | 707/737 |
| 2015/0149469 A1 | 5/2015 | Xu |
| 2016/0357407 A1* | 12/2016 | Rogoway ............... G06Q 50/01 |
| 2019/0164211 A1* | 5/2019 | Andrew ................. G06F 16/58 |
| 2019/0244222 A1 | 8/2019 | Rathod |
| 2019/0340252 A1* | 11/2019 | Huyghe ................ G06F 16/532 |
| 2021/0081651 A1* | 3/2021 | Gorodyansky ..... G06F 16/9035 |

* cited by examiner

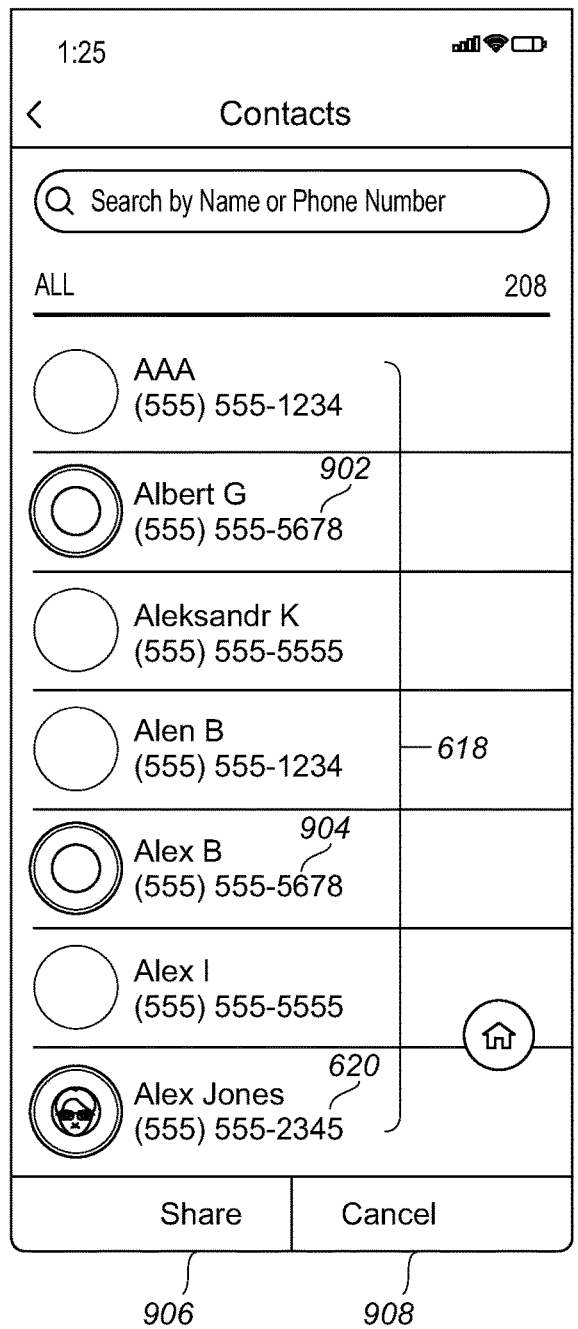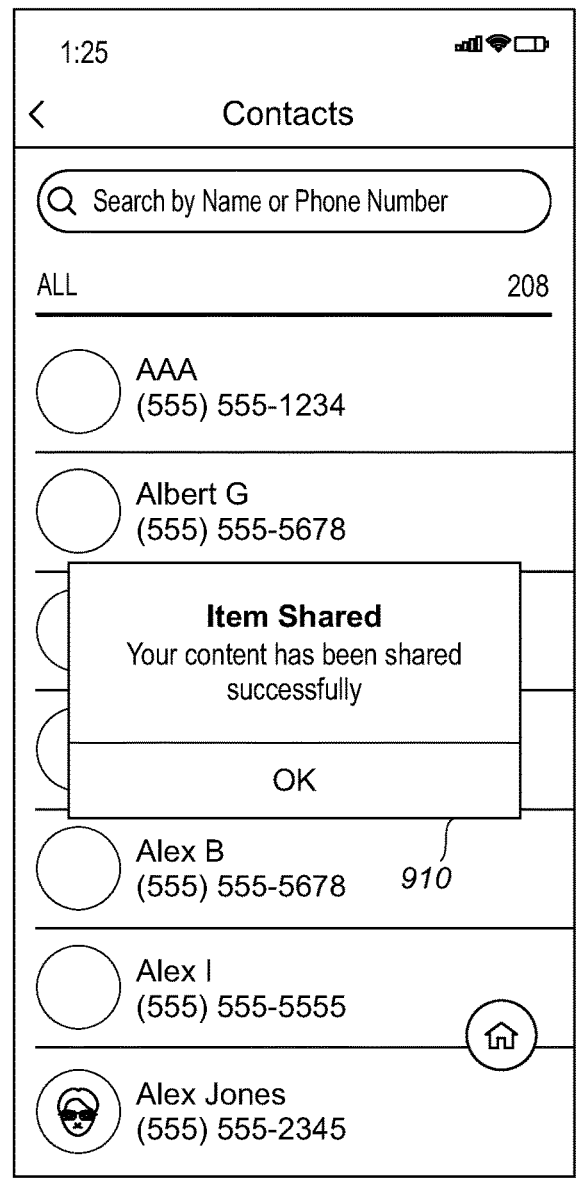
FIG. 9A
FIG. 9B

SYSTEM AND METHOD FOR MANAGING RELATIONSHIPS, ORGANIZATION, RETRIEVAL, AND SHARING OF DIFFERENT TYPES OF CONTENTS ACCESSIBLE BY A COMPUTING DEVICE

CROSS REFERENCE TO RELATED APPLICATIONS

This application claims benefit of U.S. Provisional Patent Application No. 63/343,740, filed on May 19, 2022, the contents of which are incorporated herein by reference in their entirety.

BACKGROUND

Field

The present application relates to computing devices such as mobile devices, and their access and management of various contents. More specifically, the present application is directed to a system and method associated with effectively managing relationships, organization, retrieval, and sharing of different types of contents accessible by a computing device, such as a mobile device.

Brief Discussion of Related Art

Computing devices, and especially mobile devices (e.g., smartphones) are ubiquitous in today's society and have become integrated and very powerful, constantly improving execution speed and holding and/or accessing ever larger amounts of disparate types of "contents", such as emails, address book/phonebook contacts, texts (e.g., iPhone/Android texts or native texts), direct messaging messages (e.g., WhatsApp, Viber, LinkedIn, etc.), photos, notes, music, videos, calendars and calendar appointments, notes (e.g., iPhone or native notes) and notes of other applications, social networking services (SNS) posts (e.g., Facebook, etc.), shopping lists/carts from e-commerce services (e.g. Amazon, etc.), really simple syndication (RSS) feeds (e.g., Feedly, Flipboard, etc.), website webpages (e.g., identified via uniform resource locators or URLs), etcetera, hereinafter referred to as "contents" or "types of contents". However, integration and management of the aforementioned disparate contents is still very primitive, with centralized yet seamless integration and management remaining illusive.

The aforementioned types of contents generally are accessed and managed by different applications that are associated with the contents and executed by the mobile device, e.g., for searching, accessing, retrieving, and modifying contents via applications that are associated with the types of contents. Accordingly, the various types of contents are generally fragmented on the mobile devices. There is currently no systematic way to organize the fragmented types of contents on the mobile devices, such as saving, searching, retrieving, and sharing the contents centrally and uniformly on the mobile devices as certain content entries of certain content types, such that there can be achieved seamless integration, organization, management, retrieval, and sharing of the contents.

There has been limited integration of certain contents in connection with mobile devices, wherein the native phonebook application allows certain types of contents to be included in a contact record (i.e., contact) of the phonebook application, such as the contact's phone number(s), email address, company name, physical address, birthdate, website uniform resource locator (URL), description, notes, photo, as well as several other types of data, e.g., ringtone, text tone, date (e.g., anniversary). The contact and/or or the contact record therefor could be associated with a person and/or a business. However, unless included in the contact record, certain types of contents as identified above, e.g., photos (stored and accessed by a photo album application), emails of an email application, SNS posts, music or video files of associated application(s), etc., are not easily relatable or retrievable in connection with the contact.

More specifically, address book/phonebook and contacts listed therein historically have only provided basic information, such as phone number, email address, and notes. As aforementioned the contents that a contact can store (e.g., iPhone or Android address book/phonebook) are fairly limited, providing the address book/phonebook with no ability for a user to form associations or relationships among various types of contents and one or more contacts so as to generate or formulate content stories, whether personal or business related content stories, e.g., user-assigned relevant associations or relationships of a contact (e.g., person and/or business) or multiple contacts to various types of contents that are accessible by the mobile device, which inform or provide a user with information about a certain contact or a group of contacts by its/their relevant associations to various types of contents.

Moreover, not only does current technology not provide the ability to generate relationships/associations, it provides no ability to organize and manage relationships and associations amongst the types of contents and the contacts, provides no ability for centralized searchability and retrieval of various types of contents and contact/contacts related to the contents, and further provides no ability for sharing various types of contents and their associations/relationships to various types of contents with the contact/contacts.

It is therefore desirable to provide robust system and method that provide a paradigm shift in forming relationships, providing centralized management, organization, searching, retrieval, and sharing capabilities of disparate types of contents (content entries) using a computing device such as a mobile device, as well as enabling formation and use of storylines regarding relationships of different types of content entries to a contact or multiple contacts, or to one or more search terms.

SUMMARY

There is provided a system and method associated with effectively managing relationships, organization, retrieval, and sharing of different types of contents (content entries) accessible by a computing device such, as a mobile device.

In accordance with an embodiment, there is disclosed a method of managing contents using a computing device. The method includes accessing a content entry from a content source; adding at least one of a tag, a memo, or a contact for association with the content entry; posting the at least one of the tag, the memo, or the contact in association with a link to the content entry, as a record associated with the computing device in a database; and displaying the content entry as accessed in association with the at least one of the tag, the memo, or the contact as posted.

In some cases, accessing the content entry from the content source can include receiving a selection of a content type associated with the content entry; receiving a selection of a content source associated with the content type; receiving a selection of the content entry; and returning the link to the content entry.

The method can further include storing the content entry in the database or on the computing device; and returning the link to the content entry stored in the database or on the computing device.

In some cases, accessing the content entry from the content source can include navigating to a web page in a web browser; executing share functionality of the web browser in connection with the web page; receiving a selection of a content application in connection with the share functionality; and sharing a link associated with the web page with the content application, the link associated with the web page as shared being the link to the content entry.

In some cases, accessing the content entry from the content source can include receiving a selection of a content type associated with the content entry; receiving a link associated with a web page; and returning the link associated with the web page as the link to the content entry.

The method can further include generating a storyline associated with the contents. In some instances, generating the storyline associated with the contents can include receiving a selection of a content type from a plurality of content types; receiving a selection of the content entry from a plurality of content entries associated with the content type as selected; retrieving one or more content entries associated with each of at least one other content type, the content entries related to the content entry as selected; and generating the storyline for the content entry as selected, the storyline including the one or more content entries associated with each of the at least one other content type as retrieved. In other instances, generating the storyline associated with the contents can include receiving a search term; retrieving one or more content entries associated with each of at least one content type, each of the one or more content entries associated with at least one of the tag, the memo, the contact, a link, or other textual data that includes the search term; and generating the storyline for the search term, the storyline including the one or more content entries associated with each of at least one other content type. In further instances, generating the storyline associated with the contents can include receiving a selection of a content type from a plurality of content types; receiving a selection of the content entry from a plurality of content entries associated with the content type as selected; receiving a selection of the tag associated with the content entry as selected; retrieving one or more content entries associated with each of at least one other content type, the one or more content entries related to the tag associated with the content entry as selected; and generating the storyline for the tag as selected, the storyline including the one or more content entries associated with each of the at least one other content type as retrieved.

In some cases, generating the storyline associated with the contents can include receiving a search term; retrieving one or more content entries associated with each of at least one content type, each of the one or more content entries associated with at least one of the tag, the memo, the contact, a link, or other textual data that includes the search term; and generating the storyline for the search term, the storyline including the one or more content entries associated with each of at least one other content type. In other cases, wherein generating the storyline associated with the contents can include receiving a selection of a content type from a plurality of content types; receiving a selection of the content entry from a plurality of content entries associated with the content type as selected; receiving a selection of the tag associated with the content entry as selected; retrieving one or more content entries associated with each of at least one other content type, the one or more content entries related to the tag associated with the content entry as selected; and generating the storyline for the tag as selected, the storyline including the one or more content entries associated with each of the at least one other content type as retrieved.

In some cases, the method can include sharing the content entry with a contact of a second computing device. In some instances, sharing the content entry with the contact of the second computing device can include generating a second record associated with the second computing device in the database; copying the link to the content entry to the second record, including the at least one of the tag, the memo, or the contact in association with the link; and notifying the contact of the second computing device that the content entry was shared, wherein the second computing device is capable of displaying the content entry represented by the link and the at least one of the tag, the memo, or the contact. In other instances, sharing the content entry with the contact of the second computing device can include copying the content entry including the at least one of the tag, the memo, or the contact in association with the content entry to the second computing device; posting the at least one of the tag, the memo, or the contact in association with a second link to the content entry as copied, as a record associated with the second computing device in the second database; and notifying the contact of the second computing device that the content entry was shared from a contact of the first computing device, wherein the second computing device is capable of displaying the content entry as copied represented by the second link and the at least one of the tag, the memo, or the contact.

In accordance with another embodiment, there is disclosed a system to manage contents. The system includes a computing device, and a memory device storing instructions that, when executed by the computing device, cause the computing device to perform the following operations.

The operations of the system include accessing a content entry from a content source; adding at least one of a tag, a memo, or a contact for association with the content entry; posting the at least one of the tag, the memo, or the contact in association with the link to the content entry, as a record associated with the computing device in a database; and displaying the content entry as accessed in association with the at least one of the tag, the memo, or the contact as posted.

In some cases, the operation of accessing the content entry from the content source can include receiving a selection of a content type associated with the content entry; receiving a selection of a content source associated with the content type; receiving a selection of the content entry; and returning the link to the content entry.

The operations of the system can further include storing the content entry in the database or on the computing device; and returning the link to the content entry stored in the database or on the computing device.

In some cases, the operation of accessing the content entry from the content source can include navigating to a web page in a web browser; executing share functionality of the web browser in connection with the web page; receiving a selection of a content application in connection with the share functionality; and sharing a link associated with the web page with the content application, the link associated with the web page as shared being the link to the content entry. In other cases, the operation of accessing the content entry from the content source can include receiving a selection of a content type associated with the content entry; receiving a selection of a content source associated with the content type; receiving a link associated with a web page; and returning the link associated with the web page as the link to the content entry.

The operations of the system can further include generating a storyline associated with the contents. In some instances, the operation of generating the storyline associated with the contents can include receiving a selection of a content type from a plurality of content types; receiving a selection of the content entry from a plurality of content entries associated with the content type as selected; retrieving one or more content entries associated with each of at least one other content type, the content entries related to the content entry as selected; and generating the storyline for the content entry as selected, the storyline including the one or more content entries associated with each of the at least one other content type as retrieved. In other instances, the operation of generating the storyline associated with the contents can include receiving a search term; retrieving one or more content entries associated with each of at least one content type, each of the one or more content entries associated with at least one of the tag, the memo, the contact, a link, or other textual data that includes the search term; and generating the storyline for the search term, the storyline including the one or more content entries associated with each of at least one other content type. In further instances, the operation of generating the storyline associated with the contents can include receiving a selection of a content type from a plurality of content types; receiving a selection of the content entry from a plurality of content entries associated with the content type as selected; receiving a selection of the tag associated with the content entry as selected; retrieving one or more content entries associated with each of at least one other content type, the one or more content entries related to the tag associated with the content entry as selected; and generating the storyline for the tag as selected, the storyline including the one or more content entries associated with each of the at least one other content type as retrieved.

The operations of the system can further include sharing the content entry with a contact of a second computing device. In some cases, the operation of sharing the content entry with the contact of the second computing device can include generating a second record associated with the second computing device in the database; copying the link to the content entry to the second record, including the at least one of the tag, the memo, or the contact in association with the link; and notifying the contact of the second computing device that the content entry was shared, wherein the second computing device is capable of displaying the content entry represented by the link and the at least one of the tag, the memo, or the contact. In other instances, the operation of sharing the content entry with the contact of the second computing device can include copying the content entry including the at least one of the tag, the memo, or the contact in association with the content entry to the second computing device; posting the at least one of the tag, the memo, or the contact in association with a second link to the content entry as copied, as a record associated with the second computing device in the second database; and notifying the contact of the second computing device that the content entry was shared from a contact of the first computing device, wherein the second computing device is capable of displaying the content entry as copied represented by the second link and the at least one of the tag, the memo, or the contact.

These and other purposes, goals and advantages of the present application will become apparent from the following detailed description of example embodiments read in connection with the accompanying drawings.

BRIEF DESCRIPTION OF THE DRAWINGS

Some embodiments are illustrated by way of example and not limitation in the figures of the accompanying drawings in which:

FIGS. 9A and 9B illustrate example pages to share a selected content entry from the content application of one computing device with a content application of another computing device as associated with a selected contact, including zero or more of the tagged contacts, tags, and/or memos associated with the selected content entry, in accordance with FIG. 9;

DETAILED DESCRIPTION

A system and method associated with effectively managing relationships, organization, retrieval, and sharing of different types of contents accessible by a computing device, such as a mobile device are disclosed herein. In the following description, for the purposes of explanation, numerous specific details are set forth in order to provide a thorough understanding of example embodiments or aspects. It will be evident, however, to one skilled in the art, that an example embodiment may be practiced without all of the disclosed specific details.

Figure 1:
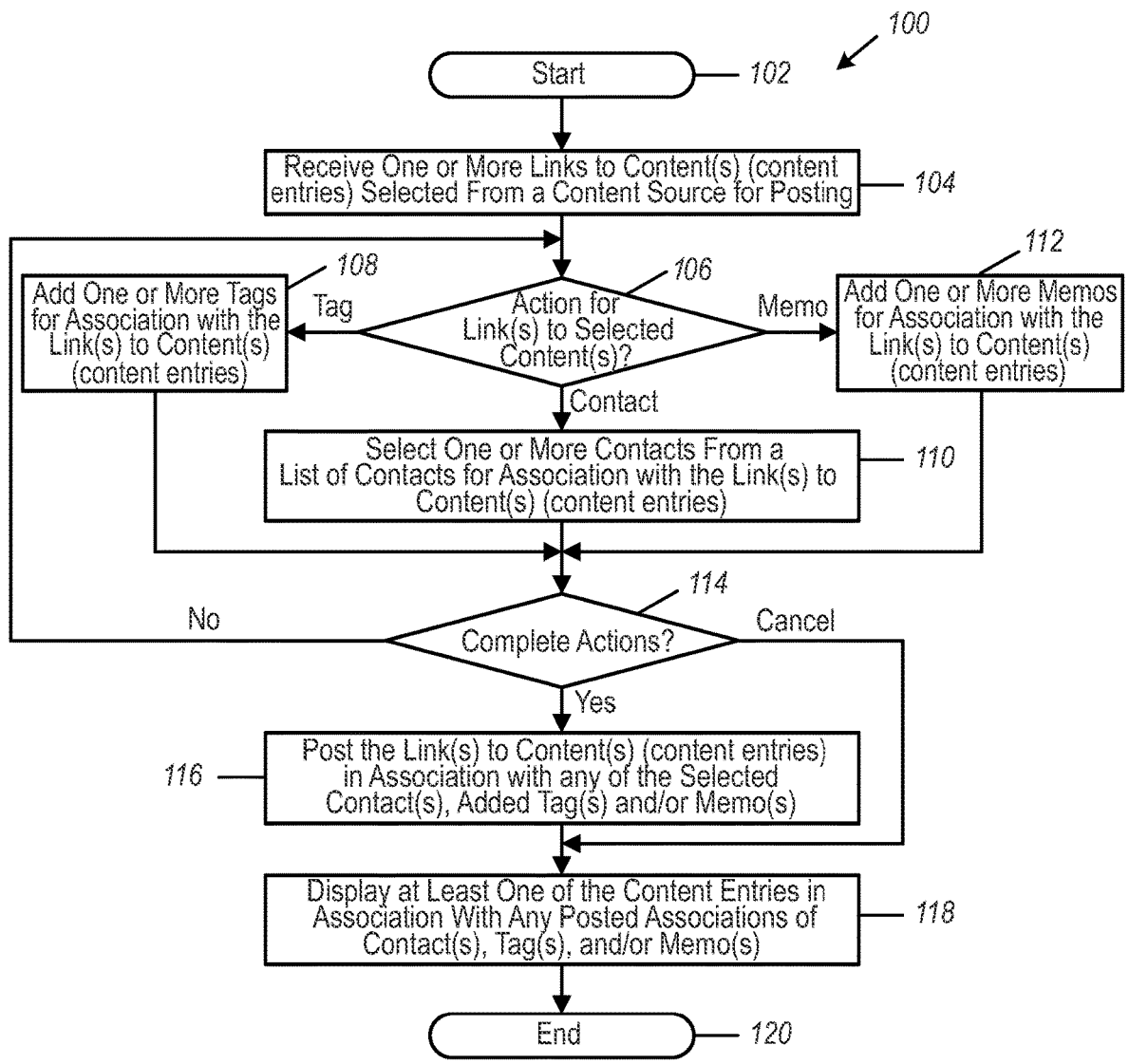
FIG. 1 illustrates a flowchart of an example method of associating contents (content entries) or links to the contents (content entries) selected by a computing device with one or more of tag(s), memo(s), and/or contact(s), and generating a database of a content application and/or creating/updating a record in the database in which the selected content entries or links to the content entries are associated with the tag(s), memo(s), and/or contact(s)

FIG. 1 illustrates a flowchart of an example method 100 of associating various contents (content entries) or links to the contents (content entries) selected or accessed by a computing device (e.g., mobile device, smartphone, etc.) with one or more of tag(s), memo(s), and/or contact(s), and generating a database of a content management application and/or creating/updating a record in the database in which the selected contents (content entries) or links to the selected or accessed contents (content entries) are associated with the tag(s), memo(s), and/or contact(s). The types of contents as defined hereinabove can be local to the content management application (e.g., stored or accessed by the content management application 316) of the mobile device executing the example method 100, or can be managed by an application that is external to the content application executing the example method 100.

Herein, a link to a certain content (content entry) identifies the content (content entry) uniquely so that it can be received or accessed by a content management application 316, such as, for example, via a filename and location of the content (content entry), and/or one or more other characteristics that uniquely identify or distinguish certain content (content entry) from other contents (content entries) for access by the content management application, whether disposed on the computing device or disposed outside the computing device. For example, the link can be a hyperlink, or a uniform resource locator (URL), or another type of link or methodology that can be used to identify and access contents (content entries) of various content types, such as photos, a video or music files, notes, document files (e.g., PDF file), webpages, emails, etc., e.g., the content types 616 illustrated in FIG. 6A.

For purposes of clarity and brevity, the content management application 316 (e.g., called "Tokpee") that manages relationships, organization, retrieval, and sharing of different types of contents (content entries) in accordance with the disclosure of this application is referenced herein as the "content management application," "content management app," "content application," "content app," or simply the "application".

The example method 100 starts at operation 102, wherein a user executes on a computing device a content management application 316 that, among other features as described herein, manages, organizes, and relates one or more types of contents (content entries) to one or more tags, one or more memos, and/or one or more contacts.

Figure 2:
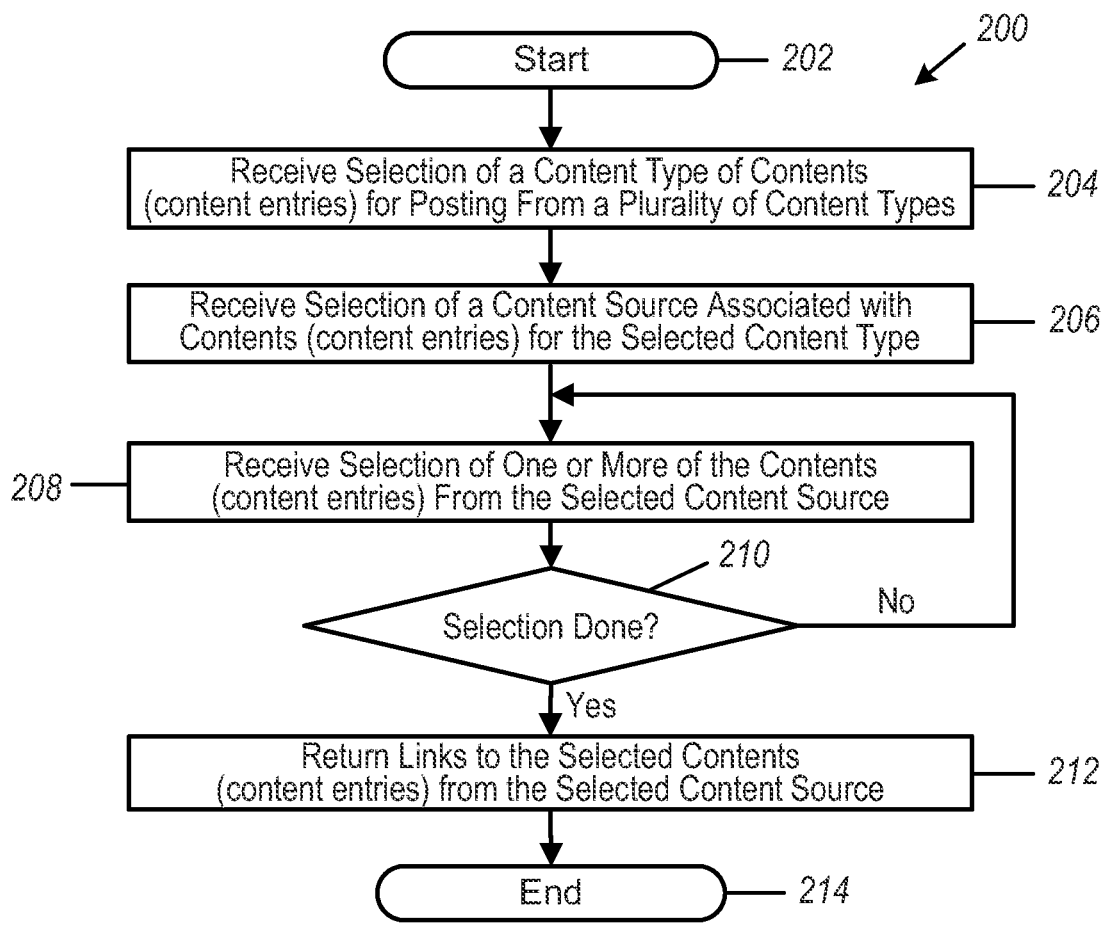
FIG. 2 illustrates a flowchart of an example method of returning one or more links to selected contents (content entries) from a selected content source to the example method illustrated in FIG. 1.
Figure 3:
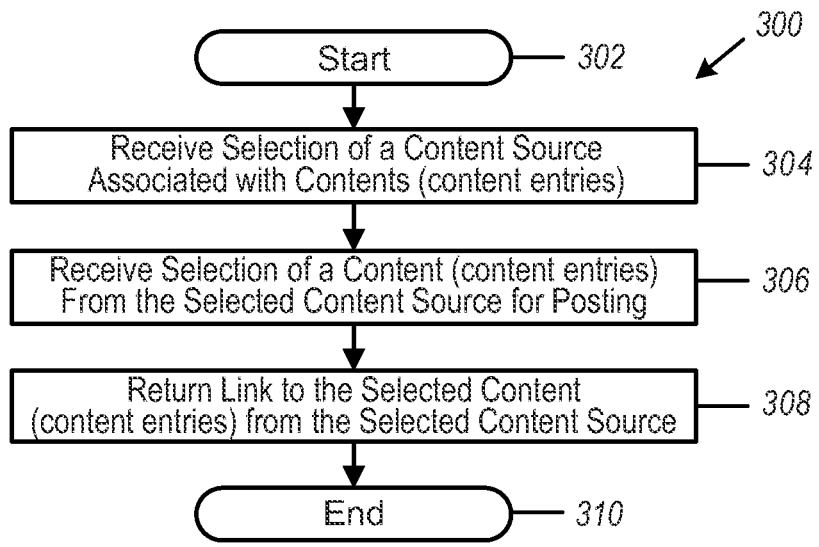
FIG. 3 illustrates a flowchart of another example method of returning a link to a selected content (content entry) from a selected content source to the example method illustrated in FIG. 1.

At operation 104, one or more content(s) (content entries), e.g., content entries themselves or links to content entries, as selected is received or accessed from a content source for posting in the content application 316. In particular, contents (content entries) that are locally accessible to the computing device (e.g., stored on the computing device or on cloud storage, e.g., iCloud photos or Google photos, associated with the computing device) on which the content application 316 is executed (e.g., computing device 402 illustrated FIG. 4), can be received or accessed via an example method as illustrated in FIG. 2, while contents (content entries) that are external to the computing device on which the application is executed, can be received or accessed via an example method as illustrated in FIG. 3, both of which will be described hereinbelow in greater detail. It should be noted, however, that the selection of one or more contents or links to contents (e.g., content entries) to be received or accessed for posting can be accomplished programmatically in other ways as long as the contents or links to the contents (content entries) can be represented, referenced, accessed, and/or retrieved in the content application 316 for management of relationships, organization, retrieval, and sharing associated with the content entries in accordance with the systems, methods, and/or methodologies as disclosed herein.

Thereafter, the example method 100 proceeds to operation 106, wherein a determination is made as to an action that a user would like to perform in connection with the selected contents or links to the selected contents (content entries). A user can decide to associate or add for association one or more contacts, one or more tags, and/or one or more memos with the received or accessed contents and/or links to the contents (content entries), as will be described in greater detail immediately below.

If it is determined at operation 106 that the user would like to tag the one or more contents or links contents (content entries) with one or more tags (e.g., a tag being a descriptive term, a symbol, or a combination thereof associated with a content entry), then the method continues at operation 108 wherein the user can add one or more tags for association with the one or more contents or links to the one or more contents (content entries) that were received or accessed at operation 104. An example of tagging a content or link to the content with one or more tags will be described below in greater detail hereinbelow with reference to FIGS. 2D and 2F. The method 100 then continues at operation 114, as will be described below in greater detail.

However, if it is determined at operation 106 that the user would like to add one or more memos (e.g., a memo being a descriptive phrase, slogan, or sentence(s), or combination thereof associated with a content entry) associated with the one or more contents or links to contents (content entries), then the example method 100 continues at operation 112, wherein the user can add one or more memos for association with the one or more contents or the links to the contents (content entries) that were received or accessed at operation 104. An example of adding one or more memos in association with a content or link to the content (content entry) will be described below in greater detail with reference to FIGS. 2D and 2G. The example method 100 then continues at operation 114, as will be described below in greater detail.

Lastly, if it is determined at operation 106 that the user would like to associate the one or more contents or links to the contents (content entries) with one or more contacts, then the example method 100 continues at operation 110, wherein the user can add (select) one or more contacts from a contact list (e.g., address book/phonebook) for association with the one or more contents or links to the contents (content entries) that were received or accessed at operation 104. An example of selecting one or more contacts in association with a content or link to the content (content entry) will be described below in greater detail with reference to FIGS. 2D and 2E. The example method 100 then continues at operation 114, as will be described immediately below in greater detail.

At operation 114, a determination is made as to whether an action or actions have been completed in connection with the referenced associations to the selected content(s) or the link(s) to selected content(s) (content entries), or if a further action or actions in connection with posting should be canceled. If it is determined at operation 114 that a further action or actions in connection with posting should be canceled, the method 100 continues at operation 118, as described in greater detail below.

However, if it is determined that the action or actions are not yet completed at operation 114, the example method 100 continues at operation 106, and one or more of the operations 108, 110, and/or 112 can then be iterated until is it determined at operation 114 that the action or actions have been completed in connection with the associations to the selected content(s) or the link(s) to the selected content(s) (content entries).

Figure 2A:
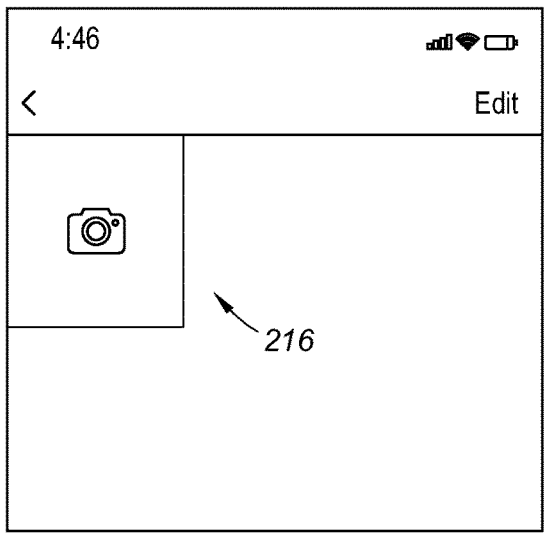
FIGS. 2A-2H illustrate example pages to create/update a record in the database of the content application that associates certain contents (content entries) or the links to the contents (content entries) selected by the computing device with one or more of tag(s), memo(s), and/or contact(s) in accordance with FIGS. 1 and 2.
Figure 2C:
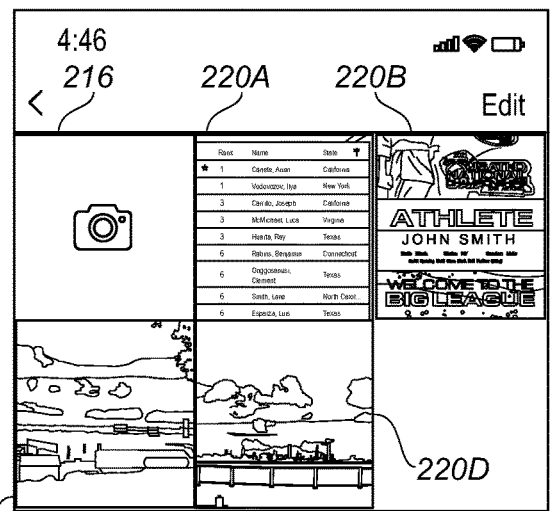
Figure 2B:
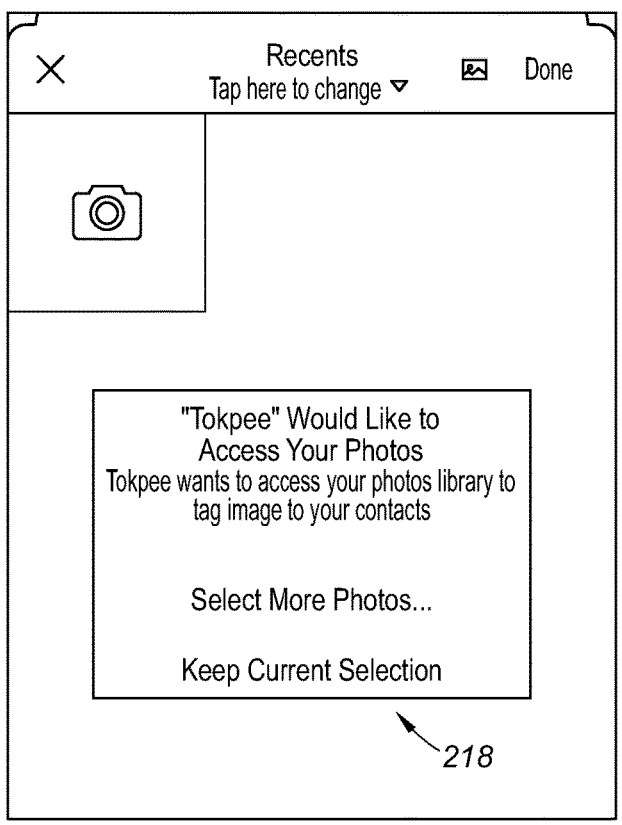
Figure 4:
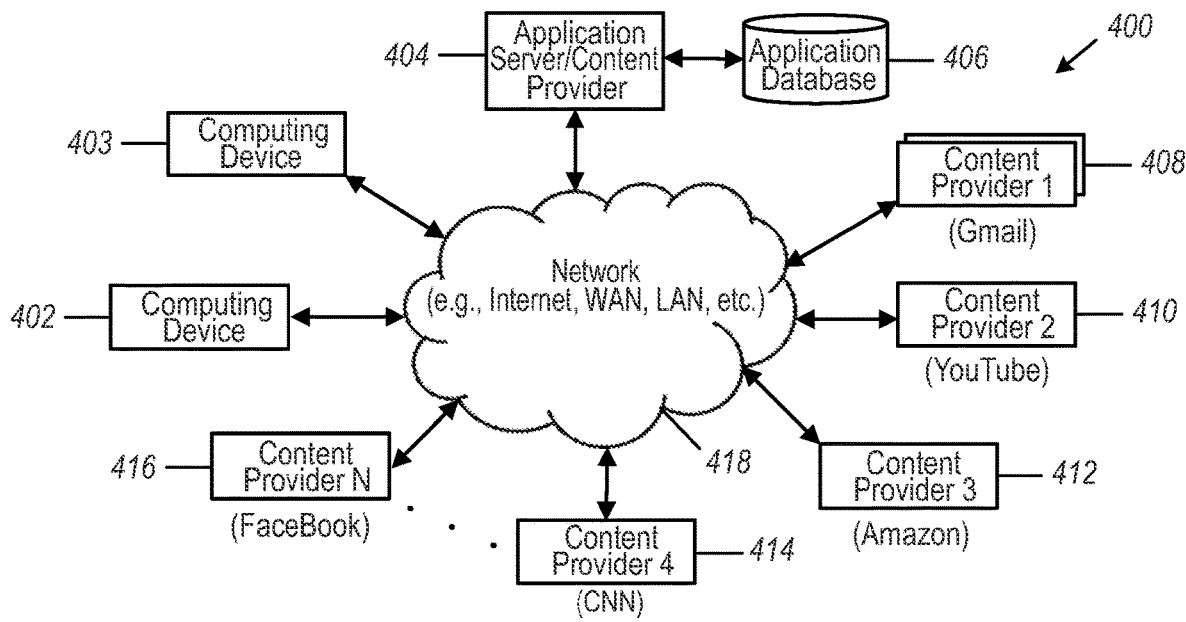
FIG. 4 illustrates a block diagram of an example system to manage relationships, organization, retrieval, and sharing of different types of contents (content entries) that are accessible by one or more computing devices.
Figure 5:
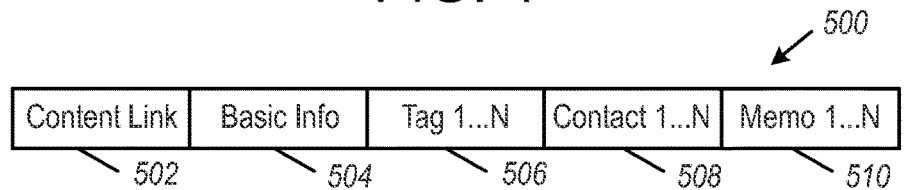
FIG. 5 is an example record of an example database of the content application that is used to manage relationships, organization, retrieval, and sharing of different types of contents accessible by the computing devices.

Alternatively, if it is determined that the action or actions are completed at operation 114, then the example method 100 continues at operation 116, wherein the selected contents or links to contents (content entries) are posted in association with any contact(s), tag(s), and/or memo(s). Posting generates a database 406 of the content application 316, and/or updates/creates a record 500 in the database 406 in which the contents or links to the contents (content entries) are associated with one or more tags, one or more memos, and/or one or more contacts. For example, the associations can be stored as example records 500 as illustrated in FIG. 5, in an example application database 406 of the application server/content provider 404 as illustrated in FIG. 4. Alternatively, the associations to the contents or the links to the contents (content entries) can be stored on the computing device (e.g., mobile device, smartphone, etc.), such as in a table, a file, etc. As an example, a photo 220D or link to photo 220D (content entry) as illustrated in FIG. 2C is associated with certain memo(s) 270, tag(s) 262, and contact(s) 246, as illustrated in FIG. 2H. The associations can thereafter be managed, e.g., the associations can be changed to refer to greater or fewer contents or links to contents, and/or one or more associations can be deleted, and/or one or more other associations can be added.

Thereafter, at operation 118, there is displayed at least one of the content entries in association with any tag(s), memo(s), and/or contact(s) as posted. In some embodiments, one or more of the aforementioned associations can be immediately updated or applied in relation to the selected photo 220D (content entry) or multiple selected photos 220A-220D (content entries) when the association(s) is/are posted, or in some other embodiments, one or more of the aforementioned associations can be updated or applied upon executing an update, such as using update button 248, as described in greater detail below with reference to FIG. 2H. The method 100 then ends at operation 120. As an example, if no associations have been previously posted via operations 106-116, the content or link to the content (content entry) (e.g., a photo 220D or link to photo 220D) can be displayed without any posted associations (e.g., memo(s) 270, tag(s) 262, and/or contact(s) 246), as particularly illustrated in FIG. 2D. Alternatively, if one or more associations have been previously posted via operations 106-116, the content or link to the content (content entry) (e.g., a photo 220D or link to photo 220D) can be displayed with any posted associations (e.g., memo(s) 270, tag(s) 262, and/or contact(s) 246), as particularly illustrated in FIG. 2H. At operation 118, the example method 100 ends.

FIG. 2 illustrates a flowchart of an example method 200 of returning one or more links to selected contents (content entries) from a selected content source to the example method 100, as illustrated in FIG. 1. More specifically, the example method 200 returns the one or more links to selected contents (content entries) to operation 104, as particularly described hereinabove with reference to FIG. 1. The example method 200 starts at operation 202.

At operation 204, a selection is received of a content type of contents (content entries) for posting from a plurality of content types. The content type can be address book (contacts), photos, notes, web pages, etc. selected from a plurality of content types 616 of home page 614, as described hereinbelow with reference to FIG. 6A. For example, a selection of a content type "photos" 616B is received at operation 204. At operation 206, a selection of a content source associated with the selected content type can be received. For example, a selection of a "photo library" 218 is received as illustrated in FIG. 2B via a camera button 216 of FIG. 2A, wherein the photo library is disposed, e.g., locally on the computing device (e.g., computing device 402 as illustrated in FIG. 4) or on cloud storage associated with the computing device (e.g., iCloud photos or Google photos). At operation 208, a selection of one or more of the contents (content entries) or links to content entries from the selected content source is received. The one or more contents can be selected by a user via the content application 316. For example, a selection of the photos 220A-220D or links to the photos is received (e.g., via user selection) from the photos library on the computing device (e.g., computing device 402) or cloud storage associated with the computing device, as illustrated in FIG. 2C. As an example, the application server/content provider 404 can store the selected photos (content entries) or links to the selected photos (content entries) in the application database 406, as illustrated in FIG. 4.

Thereafter, at operation 210, a determination is made as to whether selection of the contents (content entries) from the selected content source is completed. If it is determined that the selection is not completed, the example method 200 continues at operation 208, and operations 208-210 are iterated until is it determined at operation 210 that the selection has been completed. For example, camera button 216 is selected as illustrated in FIG. 2A, selection of content source 218 (e.g., photo library) disposed on the computing device or on cloud storage associated with the computing device, and associated with the selected content type (e.g., photos 616B) is received as illustrated in FIG. 2B, and any additional photos or links to the photos as selected from the photo library would thus be similarly illustrated in FIG. 2C. In a similar fashion, the additional photos (content entries) or links to the photos (content entries) as selected (e.g., via user selection) can be stored in the application database 406 by the server/content provider 404.

Thereafter, at operation 212 the links to the selected contents (content entries) from the selected content source are returned in connection with posting, as illustrated at operation 104 in FIG. 1. The method 200 ends at operation 214.

Figure 6:
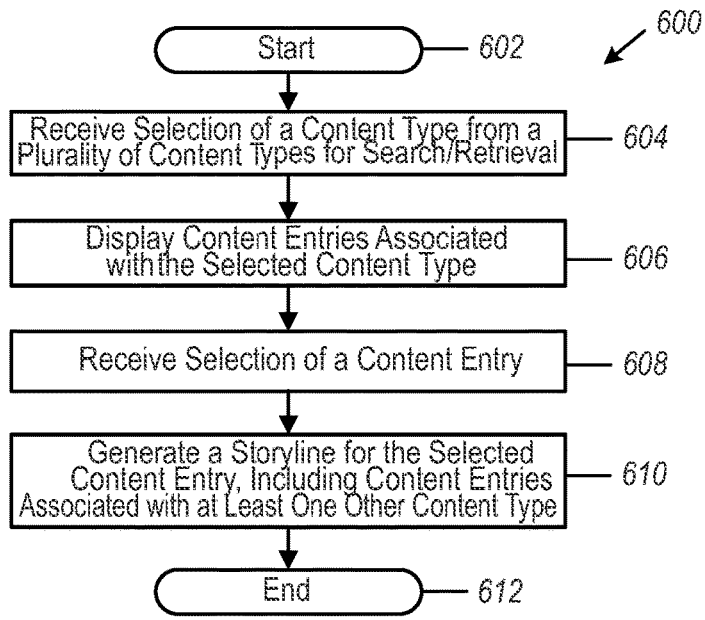
FIG. 6 illustrates a flowchart of an example method of generating a storyline in connection with a selected content entry of a selected content type from a plurality of content types, as illustrated in FIGS. 6A and 6B.
Figures 6A, 6B:
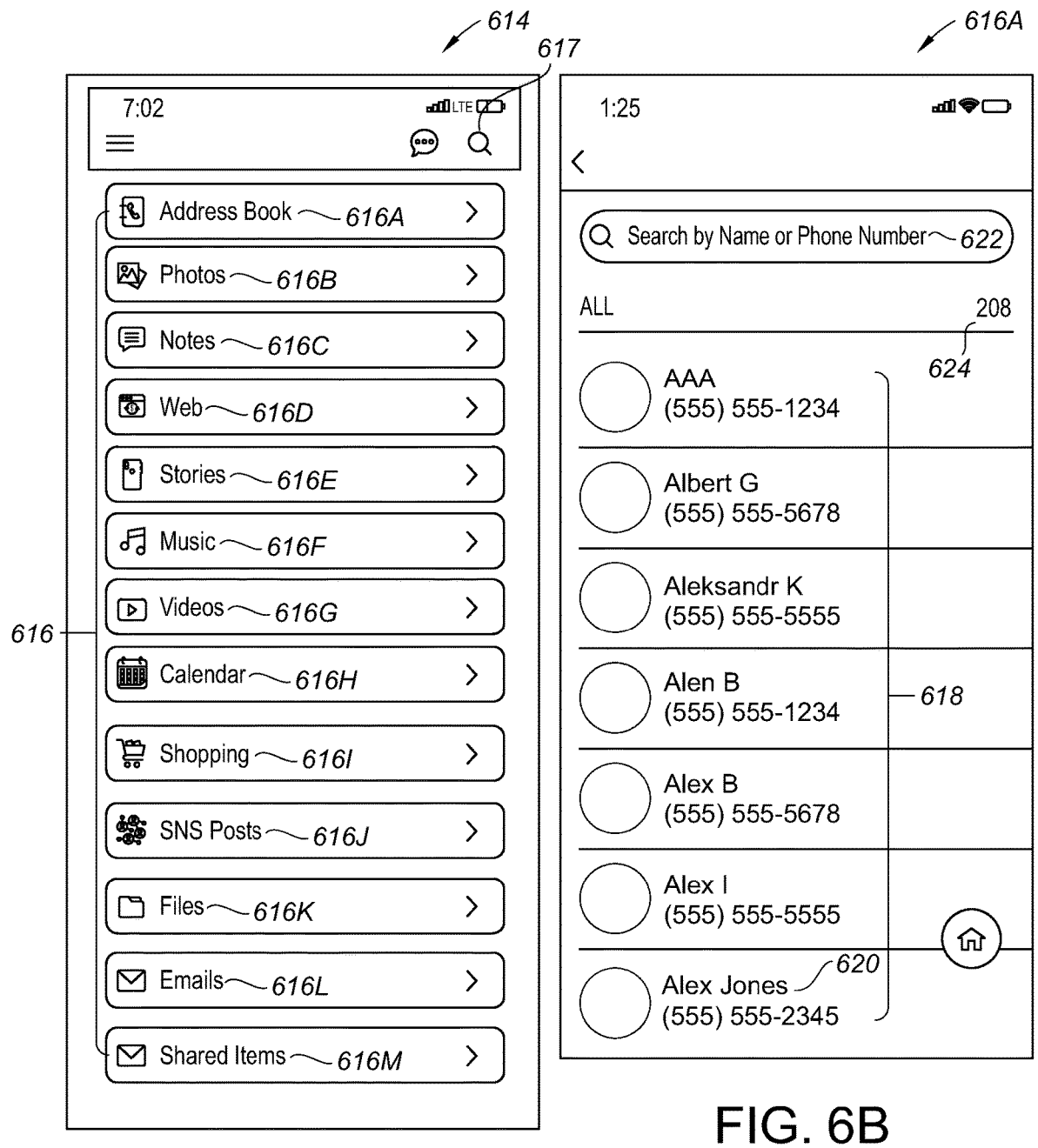
FIGS. 6A-6D illustrate example pages to generate a storyline in connection with a selected content entry of a selected content type from a plurality of content types, in accordance with FIG. 6.

It should be noted that, while the operations of the method 200 were illustrated using content type "photos" 616B as illustrated in FIG. 6A for conciseness and clarity, the method 200 is nonetheless applicable to other types of contents (e.g., videos, music, notes, document files, webpages, emails, etc., including the content entries of the content types 616 as illustrated in FIG. 6A) that are accessible by the computing device 402.

FIGS. 2A-2H illustrate example pages to create/update a record 500 in database 406 of the content application that associates certain contents (content entries) or links to the contents (content entries) selected by the computing device 402 with one or more of tag(s), memo(s), and/or contact(s), in accordance with FIGS. 1 and 2.

In one example, a user can select a content type "photos" 616B from a plurality of content types 616 as illustrated in an example homepage 614, as illustrated in FIG. 6A. Thereafter, a selection of a content source associated with the selected content type can be received, as illustrated in FIGS. 2A and 2B. In particular, upon selection of camera button 216 as illustrated in FIG. 2A, the user can then select the photo library 218 as the content source that is disposed locally on the computing device (e.g., computing device 402) or on cloud storage associated with the computing device (e.g., iCloud photos or Google photos), as illustrated in FIG. 2B. Thereafter, the user can select one or more photographs (e.g., content entries or links to the content entries) from the selected photo library 218. For example, photos 220A-220D or links to the photos can be selected from the selected photo library 218 on the computing device or the cloud storage that is associated with the computing device, as illustrated in FIG. 2C. The application server/content provider 404 can thus store the photos or the links to the photos in the application database 406, as illustrated in FIG. 4.

Figure 2D:
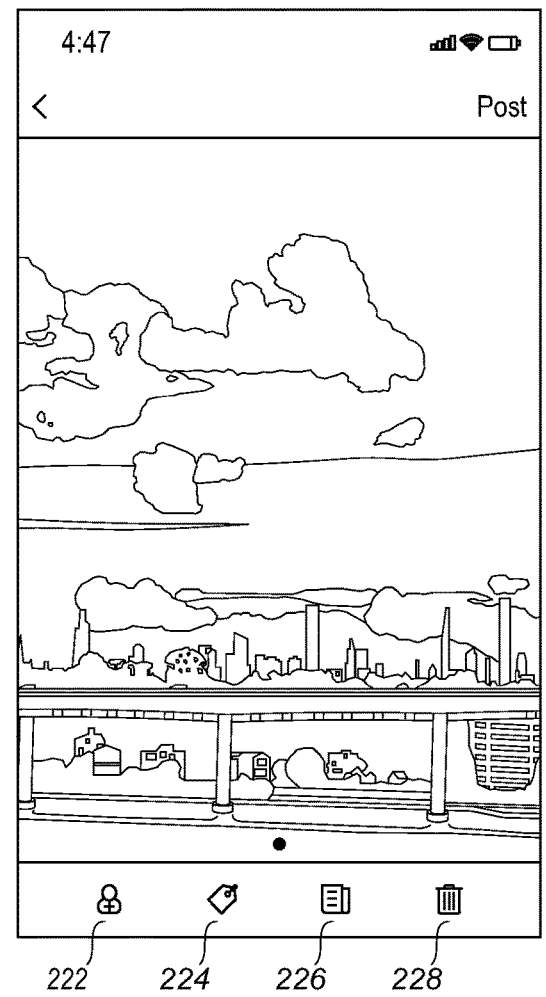

For example, the user selects photo 220D, which is displayed as illustrated in FIG. 2D. As further illustrated in FIG. 2D, the content application 316 provides the ability to associate with the selected photo 220D, one or more contacts using contact function 222, one or more tags using tag function 224, and/or one or more memos using memo function 226. Moreover, the user can delete the photo or link to the photo from the database 406 using a delete function 228. It should be noted that the content application 316 can retrieve, store, and synchronize contacts 618 (content entries) of the address book 616A (content type) as illustrated in FIGS. 6A and 6B with contacts of the native address book/phonebook maintained on the computing device (e.g., computing device 402).

Figure 2E:

As illustrated in FIG. 2E, the user can associate or tag a contact maintained by the content application 316 to the selected photo 220D. A user can enter one or more contacts by typing the contacts directly into input field 230, searching for the contacts using search field 232 with any contacts that are found displayed for selection at location 237, selecting one or more of the recently tagged contacts using button 234 with any recently tagged contacts displayed for selection at location 237, selecting one or more of the contact tags from all contact tags in the content application using button 236 with contact tags for selection displayed at location 237, and/or selecting one or more of the contacts from an address book/phonebook using button 242 with contacts for selection displayed at location 237. Upon selection of one or more contacts, such as Alex Jones and/or John Smith, the user can then post the contact selections to the associated photo content using post button 240. Otherwise, the user can cancel the association using button 238. Upon posting, the contacts are associated with the selected photo (e.g., photo 220D) and displayed in association with the selected photo 220D, thus showing the association of the contacts with the selected photo 220D at location 246.

While the aforementioned example of tagging is illustrated in connection with one selected photo 220D (content entry), it should be noted that the tagging would tag all photos (content entries) which are selected on the page as illustrated in FIG. 2C. For example, if photos 220A-220D (content entries) or links to the photos (content entries) were selected, then the aforementioned tagging by the content application 316 would post the contact selections, e.g., Alex Jones and John Smith, to all of the selected photos (e.g., photos 220A-220D), while any one of the selected photos 220A-220D (e.g., photo 220D) would be currently displayed in association with the associated contacts as posted, as particularly illustrated in FIG. 2E.

Figure 2F:
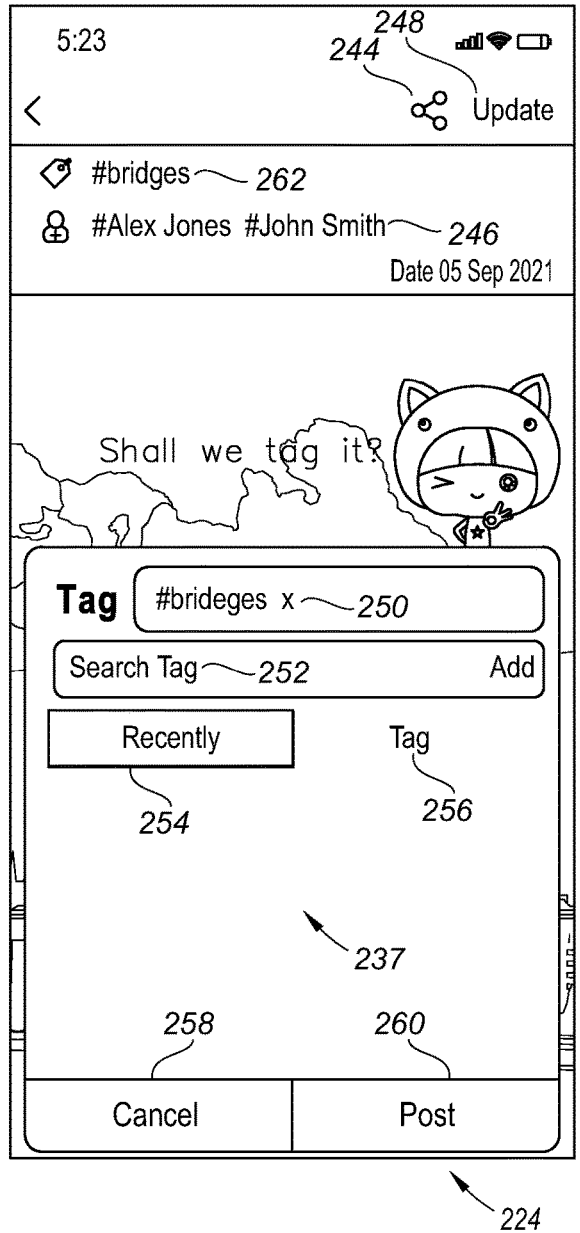

As illustrated in FIG. 2F, the user can also associate a tag maintained by the content application 316 to the selected photo (e.g., photo 220D), or multiple selected photos (e.g., photos 220A-220D). A user can enter one or more tags by typing the tags directly into input field 250, searching for the tags using search field 252 with found tags for selection displayed at location 237, selecting one or more of the recently selected tags using button 254 with recent tags for selection displayed at location 237, and/or selecting one or more of the tags from all tags in the content application using button 256 with tags for selection displayed at location 237. Upon selection of the tag, such as bridges, the user can then post the tag selection(s) to the associated photo (content entry) or photos (content entries) using post button 260. Otherwise, the user can cancel the association using button 258. Upon posting, the tag(s) are associated with the selected photo (e.g., 220D) or photos (e.g., photos 220A-220D) and displayed in association with the selected photo 220D or any one of the selected photos 220A-220D (e.g., photo 220D), thus showing the association of the tag(s) with the selected photo 220D at location 262. As particularly illustrated in FIG. 2F, contacts and tags are now associated with the photo 220D (content entry) respectively at locations 246, 262. Similarly, the selected contacts and tags would be associated with all selected photos (e.g., 220A-220D).

Figure 2G:
Figure 2H:
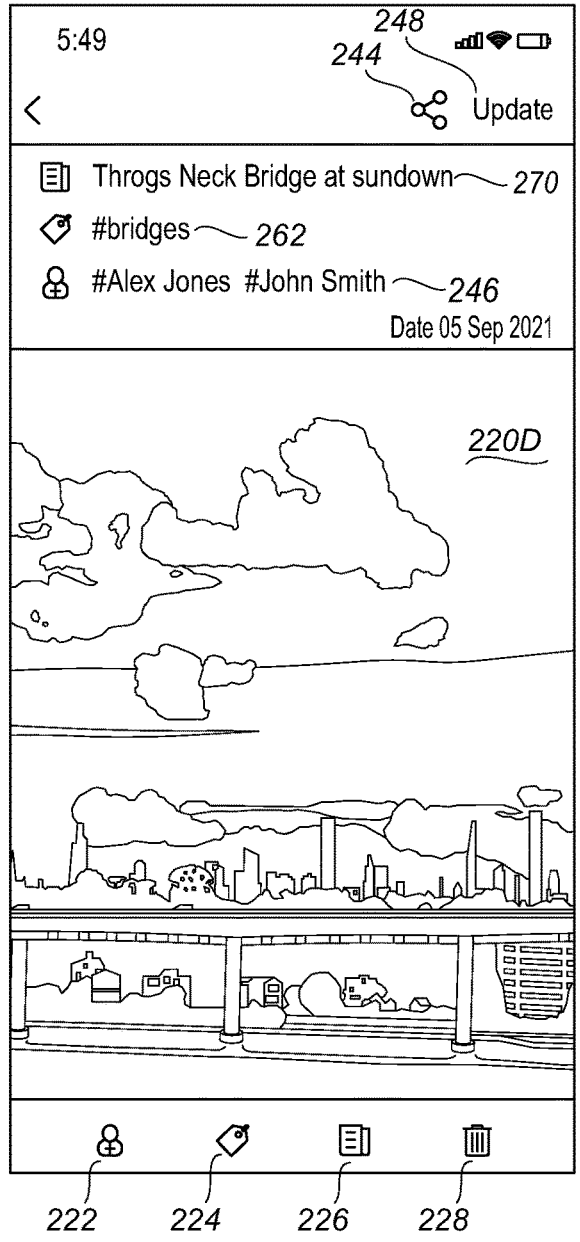

As illustrated in FIG. 2G, the user can associate a memo maintained by the content application 316 to the selected photo (e.g., photo 220D), or multiple selected photos (e.g., photos 220A-220D). A user can enter a memo that, for example, describes the content of the selected photo (e.g., photo 220D) or selected photos (e.g., 220A-220D), by typing the text of the memo directly into a memo input field 264. Upon completing the memo, such as shown in FIG. 2G, the user can then post the memo to the associated photo 220D (content entry) or multiple associated photos 220A-220D (content entries) using post button 268. Otherwise, the user can cancel the association using button 266. Upon posting, the memo(s) are associated with the selected photo 220D or multiple associated photos 220A-220D, and displayed in association with the selected photo 220D or any one of the selected photos 220A-220D (e.g., photo 220D), thus showing the association of the memo(s) with the selected photo 220D at location 270. As particularly illustrated in FIG. 2G, contacts, tags, and memos are now associated with the photo 220D (content entry) respectively at locations 246, 262, 270. Similarly, the selected contacts, tags, and memos would be associated with all selected photos (e.g., 220A-220D).

Upon completion of any one or more of the associations, or completion of all the associations, as described with reference to FIGS. 2A-2G, the associations can be updated or applied in relation to the selected content photo 220D (content entry) or multiple selected photos 220A-220D (content entries) in the database 406 using update button 248. In some embodiments, one or more of the associations as described hereinabove can be immediately updated or applied in relation to the selected content photo 220D (content entry) or multiple selected photos 220A-220D (content entries) in the database 406 when the associations are posted, such as by using the respective post buttons 240, 260, and/or 268, as particularly illustrated in FIGS. 2E-2G.

As illustrated in FIG. 2H, all posted associations are tagged to the photo 220D (content entry) or to multiple selected photos 220A-220D (content entries), while a first selected photo 220A from multiple selected photos 220A-220D of FIG. 2C is illustrated in FIGS. 2D-2H. The associations can be managed, such as being modified and/or updated using functions 222, 224, 226, and/or 248, as described in greater detail hereinabove. For example, deletion of any of the contact, tag, and/or memo associations can be performed in respective input fields 230, 250, 264 using a deletion symbol "x" to delete the association. It should be noted that the deletion symbol is not shown in relation to the memo input field 264 in FIG. 2G. Moreover, the content photo 220D can also be deleted (e.g., from the database 406) such as using a delete button 228, as particularly illustrated in FIG. 2H.

It should be noted that the aforementioned functionality illustrated in FIGS. 2A-2H can be applicable to other types of contents (e.g., content entries of various types) that are accessible by the computing device (e.g., computing device 402). In particular, while the functionality was described using content type "photos" 616B as illustrated in FIG. 6A for conciseness and clarity, the functionality is nonetheless applicable to other types of contents (e.g., videos, music, notes, document files, webpages, emails, etc., including content entries of content types 616 as illustrated in FIG. 6A) that are accessible by the computing device 402.

FIG. 3 illustrates a flowchart of another example method 300 of returning a link to a selected content (content entry) from a selected content source to the example method 100 illustrated in FIG. 1. More specifically, the example method 300 returns a link to selected content entry to operation 104, as particularly described hereinabove with reference to FIG. 1. The example method 300 starts at operation 302.

Figures 3A, 3B:
FIGS. 3A-3E illustrate example pages to create/update the record in the database of the content application that associates a certain content (content entry) or the link to the content (content entry) selected by the computing device with one or more of tag(s), memo(s), and/or contact(s) in accordance with FIGS. 1 and 3.

At operation 304, a selection is received of a content source or content provider that is associated with content for posting. For example, a news content source (e.g., Fox news) is selected, as illustrated by content provider 414 in FIG. 4. While the content source might not be local to the computing device (e.g., computing device 402), it is accessible by the computing device 402 over the network 418, such as by using a web browser (e.g., Safari on Apple iPhone illustrated in FIG. 4, Chrome on Android, or any other browser installed on a computing device, e.g., such as computing device 402). At operation 306, a selection is received of a certain content (content entry) or a link to the content entry from the selected content source. For example, a web page 312 is selected from the content provider 414, as illustrated in FIG. 3A. Based on the foregoing example, a user can use the web browser to navigate to or simply access the web page 312 of the content provider 414 over the network 418, in accordance with operations 304 and 306. Thereafter, at operation 308, the link to the selected content entry (web page 312) from the selected content source (content provider 414) is returned in connection with posting, as illustrated at operation 104 in FIG. 1.

Figure 3C:
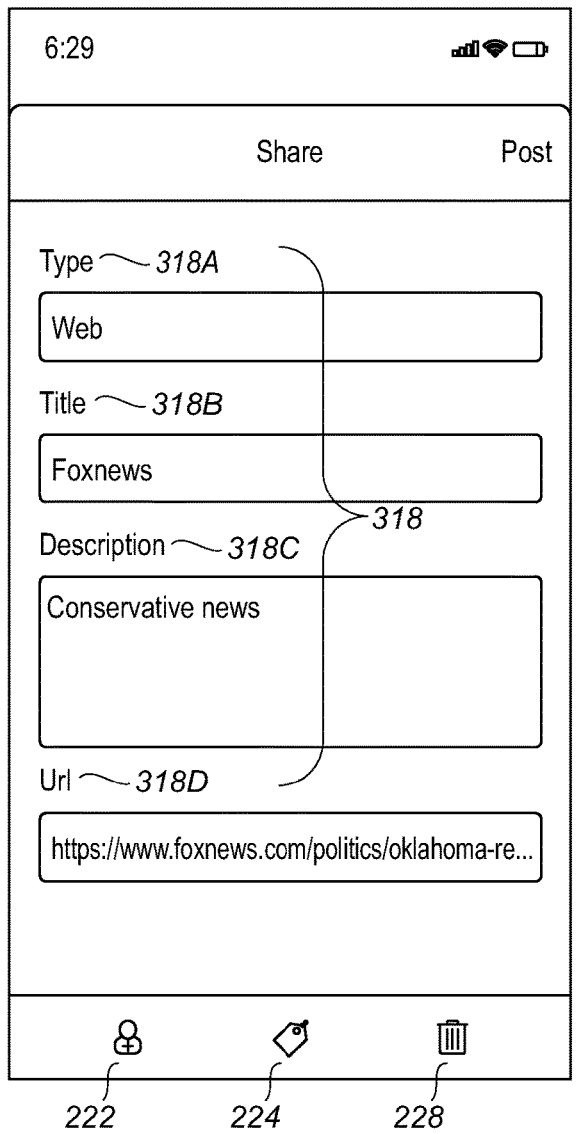
Figure 3D:
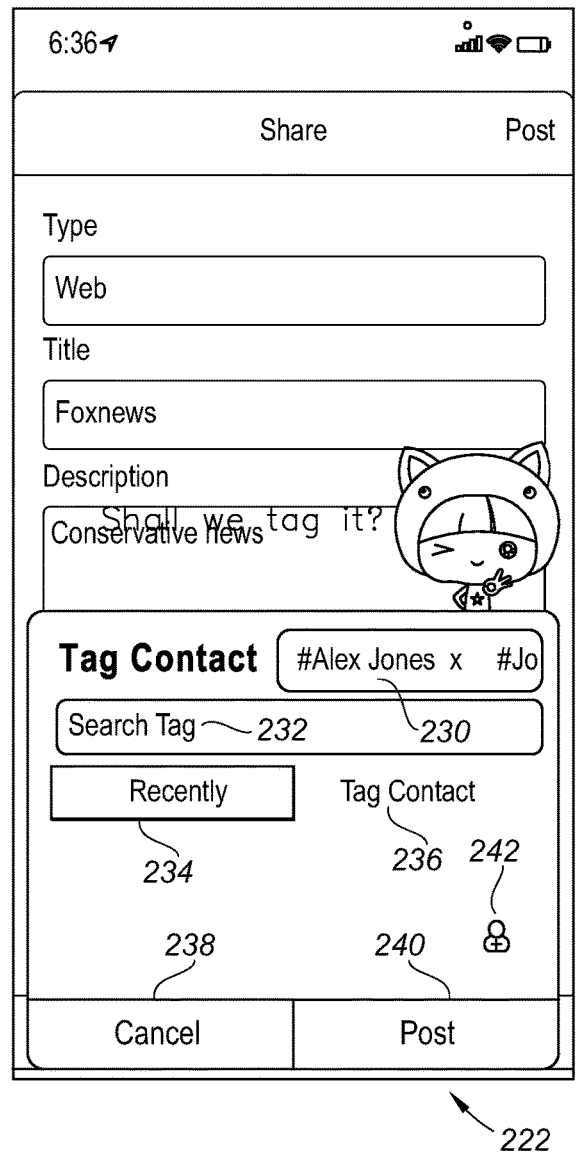
Figure 3E:
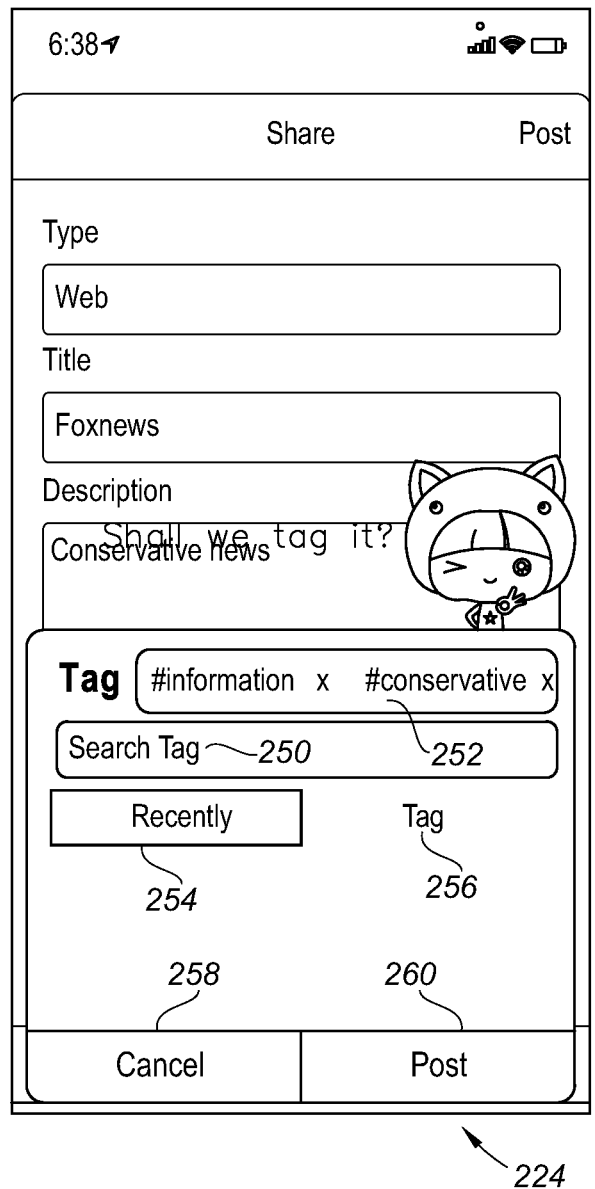

For example, a uniform resource locator (URL) to the web page 312 (content entry) can be returned to the content application by executing share functionality of the web browser using a share button 314, and then selecting the content application 316 ("Tokpee") from the list of available applications with which the link to the content is shared with the content application 316, as particularly illustrated in FIGS. 3A and 3B. Accordingly, the link identifying the web page 312 in the network 418 is returned to operation 104 of the example method 100, as particularly illustrated in FIG. 1. Upon the selection, selected content application 316 is executed, wherein contact and tag associations of operations 106, 108, 112 in FIG. 1 can be added. For example, contact and tag associations at operations 106, 108 can be added as illustrated in FIGS. 3D and 3E, respectively. In one example, the memo association at operation 112 of FIG. 1 can be added as illustrated in FIG. 3C. In particular, the memo association of operation 112 can be expanded to include basic information 318 related to type 318A, title 318B, description 318C, and URL 318D, which describe the content entry that has been shared with the content application 316. The method 300 ends at operation 310.

It should be noted that, while the operations of the method 300 were illustrated using a link to a web page for conciseness and clarity, the method 300 can nonetheless be applicable to other types of contents accessed over the network 418 (e.g., videos, music, notes, document files, emails, etc., including the content entries of the content types 616 as illustrated in FIG. 6A) that are accessible by the computing device 402.

FIGS. 3A-3E illustrate example pages to create/update the record 500 in the database 406 of the content application 316 that associates a certain content (content entry) or the link to the content (content entry) selected by the computing device 402 with one or more of tag(s), memo(s), and/or contact(s) in accordance with FIGS. 1 and 3.

In one example relating to receipt of a certain content (content entry) 104 and memo association at operation 112 of FIG. 1, a user can select a content type "Web" 616D from a plurality of content types 616 as illustrated in an example homepage 614 in FIG. 6A, and can choose to add a certain web page (content entry) associated with the content type via a selector (not shown). Upon the selection and addition of the web page (content entry), a blank page similar to the page illustrated in FIG. 3C is displayed to the user. The user can fill in the basic information 318 for a certain content entry (e.g., news web page) from a certain content source or provider (e.g., Fox News), such as title 318B, description 318C, and URL 318D. The content type 318A of the basic information 318 can be automatically indicated or pre-filled as "Web" based on the earlier content type selection, and/or may be omitted from the page in FIG. 3C. The content entry can then be posted using the post selector (top right of the page).

In another example relating to receipt of a certain content (content entry) 104 and memo association at operation 112 of FIG. 1, a user can select a news content source or provider 414 (e.g., Fox news), such as by using a web browser, and can navigate to a certain content web page 312 (content entry) from the content provider 414, or can simply access the web page 312 of the content provider 414 inputting the address of the web page 312 into the web browser, as particularly illustrated in FIG. 3A. Thereafter, the user can click a share button 314 of the web browser, and can then select the content application 316 ("Tokpee") from the list of available applications to share a link (URL) to the content entry (web page 312) with the content application ("Tokpee") 316, as illustrated in FIGS. 3A and 3B. Upon selection and execution of the content application 316, the page as shown in FIG. 3C is displayed, wherein the user can then fill in the title 318B and description 318C for the web page 312. The type of content 318A can be automatically filled in as "Web" based on the content type and/or content source. Similarly, the link to the web page 312 (content entry) as shared with content application 316 can also be automatically filled in (e.g., URL 318D). The content entry can then be posted using the post selector (top right of the page).

In either of the aforementioned examples, one or more contact associations can be added via contact functionality 222 as illustrated in FIG. 3D, and one or more tag associations can be added via tag functionality 224 as illustrated in FIG. 3E. Contact and tag associations were described in detail with reference to FIGS. 2E and 2F, and such descriptions are incorporated herein in their entirety as if fully set forth herein with respect to the content (e.g., web page 312) as illustrated in FIGS. 3A-3E. It should be noted that the memo association may be expanded to include basic information 318 as illustrated in FIG. 3C, in which the basic information related to type, title, and description describes the content entry (web page 312) that has been shared with the content application 316.

It should be noted that the aforementioned functionality illustrated in FIGS. 3A-3E can be applicable to other types of contents (e.g., content entries of various types) that are accessible by the computing device (e.g., computing device 402) over the network 418. In particular, while the functionality was described using content type "web" 616D as illustrated in FIG. 6A for conciseness and clarity, the functionality is nonetheless applicable to other types of contents (e.g., videos, music, notes, document files, emails, etc., including content entries of content types 616 as illustrated in FIG. 6A) that are accessible by the computing device 402.

FIG. 4 illustrates a block diagram of an example system 400 for managing relationships, organization, retrieval, and sharing of different types of contents (content entries) that are accessible by one or more computing devices (e.g., computing devices 402, 403), e.g., mobile devices, smartphones, or other computing devices (e.g., personal computer, laptop, etc.). The example system 400 includes example computing devices 402, 403, application server/content provider system 404 that includes an application database 406, and one or more content providers 408-416. While only several example computing devices 402, 403 are illustrated in FIG. 4, it should be noted that the system 400 can includes a plurality of different computing devices, capable of performing the functionality as described herein. The application server/content provider 404 and content providers 408-416 of the system 400 can be considered content sources that are accessible by the computing devices 402, 403 to provide disparate types of contents (content entries), in connection with the functionality and/or methodology as particularly described herein.

The computing devices 402, 403, application server/content provider 404, and content providers 408-416 can communicate via a network 418. The network can be the Internet, a wide area network (WAN), a local area network (LAN), as well as various combinations thereof, and/or other conventional network technologies (e.g., satellite), and/or yet to be developed and/or deployed technologies. The one or more computing devices (e.g., computing device 402 or 403) can generally connect to the network 418 via wired connections or wireless connections, such as Wi-Fi or cellular technology, which can include 4G, 5G, LTE, etc., as well as yet to be developed and/or deployed wired/wireless technologies.

The computing devices 402, 403 can be any electronic equipment (e.g., mobile devices) that can connect to the network 418 (e.g., Internet, WAN, LAN, etc.), especially a smartphone or tablet computer (e.g., iPhone, iPad, etc.) connectable to the network 418 via a wired or a wireless connections, using one or more of the technologies as described hereinabove. In some embodiments, one or more of the computing devices 402, 403 can also be a conventional computer, such as a desktop computer, a laptop computer, etc.

The computing devices 402, 403 are capable of executing the content management application 316, which provides effective management of relationships, organization, retrieval, and sharing of different types of contents (content entries) that are accessible by the computing devices 402, 403. In some embodiments, the content management application 316 can be an application that fully resides on a computing device (e.g., computing device 402 or computing device 403), and is self-contained in executing the functionality as described herein (e.g., without communicating with the application server/content provider 404 and/or the application database 406). In other embodiments, the content management application 316 can be an application that resides on the computing devices 402, 403, which can call certain functionality via APIs provided by the application server/content provider 404, or can be an application that partially or fully resides on the application server/content provider 404.

The application server/content provider 404 includes or can access an application database 406. The application server 404 can receive and execute calls, such as via API, from the computing devices 402, 403 to perform operations associated with the methods, functionality, and/or other methodologies as described herein. The application database 406 can store, relate, organize, retrieve, and share certain contents (content entries) or links to content entries that are accessible by the application 316, such as contacts, photos, webpages, etc. as shown and described herein. More specifically, the database 406 can store relationship records 500 which can be used to relate contents (content entries) or content links (links to content entries) to certain information and other contents or information managed by the application 316. An example database record 500 will be described in greater detail below with reference to FIG. 5. In some embodiments, the database 406 can be locally stored on the computing device (e.g., computing device 402 or computing device 403), locally accessible by the computing device (e.g., via a direct wired/wireless connection), or directly accessible by the computing device over the network 418 (e.g., without communicating with the application server/content provider 404), and the content management application 316 can thus execute the functionality as described herein by communicating with such application database 406.

The one or more content providers 408-416 can include one or more email providers 408 (e.g., Gmail, Hotmail, etc.), one or more video service providers 410 (e.g., YouTube, AppleTV, etc.), one or more online shopping and/or auction providers 412 (e.g., Amazon, eBay, etc.), one or more news providers 414 (e.g., CNN, Fox News, etc.), as well as one or more social media providers 416 (e.g., Facebook, Twitter, etc.). It should be noted that the aforementioned list of content providers is not exhaustive, and the system 400 can be easily extended to include and/or accommodate additional content providers of enumerated types of content (content entries), as well as one or more additional types of content providers and/or additional types of contents (content entries), e.g., example content types as shown on the homepage 614 in FIG. 6A.

FIG. 5 is an example record 500 of the example database 406 of the content application 316 used for managing relationships, organization, retrieval, and sharing of different types of contents (content entries) accessible by the computing devices 402, 403. The example record 500 can be maintained in the application database 406 and can include and relate fields such as a content link 502 of a content (content entry) to basic information 504 associated with the content entry (e.g., a tuple of type, title, description, and URL, as well as any additional information such as date of creation/access, etc.), one or more tags 506 related to the content entry, one or more contacts 508 related to the content entry, and one or more memos 510 related to the content entry. In some embodiments, the memo field 510 can maintain the basic information 504 associated with the content entry, and the basic info 504 can be omitted. Multiple records can be maintained for different content entries or links to content entries managed by the application 316 of the computing device (e.g., computing device 402).

FIG. 6 illustrates a flowchart of an example method 600 of generating a storyline in connection with a selected content entry (e.g., contact 620) of a selected content type (e.g., address book 616A) from a plurality of content types 616, as illustrated in FIGS. 6A and 6B.

At operation 602, the example method 600 starts, wherein the relationship application 316 is executed. At operation 604, a selection is received of a content type (e.g., address book 616A) from a plurality of content types 616 for search and/or retrieval, as managed by the content application 316. For example, a user can select the address book 616A managed by the relationship application 316 from home page 614, as particularly illustrated in FIG. 6A. At operation 606, a list of content entries (e.g., contacts 618) associated with the selected content type (e.g., address book 616A) is displayed. For example, contacts 618 are displayed from the address book 616A, as particularly illustrated in FIG. 6B.

At operation 608, a selection of a content entry is received. For example, a user can select a certain content entry (e.g., contact 620) managed by the relationship application 316, wherein the selection can be achieved by the selection of the content entry (e.g., contact 620) from the list of displayed content entries (e.g., contacts 618), or a search (e.g., full/partial text search) for a certain content entry (e.g., contact 620) contact from the list of available content entries (e.g., contacts 618) can be performed using a search function 622 followed by the selection of the content entry (e.g., contact 620) from a result of the search (not shown), as will be described in greater detail with reference to FIG. 6B.

Thereafter, at operation 610, a storyline is generated for the selected content entry (e.g., contact 620), wherein the storyline includes one or more other content types (e.g., photos 616B) and their associated contents (e.g., photos 220B and 220D), which are associated and/or related to the selected content entry (e.g., contact 620), as will be described in greater detail with reference FIGS. 6C and 6D. For example, for the selected content entry (e.g., contact 620), other content types and their associated contents are retrieved and displayed in the generated storyline, e.g., content type photos 618B and associated photo contents (e.g., photos 220B, 220D), content type notes 616C and related note contents, content type Web 618D and related web contents, content type shopping 618I and related shopping contents (e.g., webpages), content type videos 618G and related video contents, content type files 618K and related files contents, as well as any other content type and contents related that content type, as described in greater detail with reference to FIG. 6A, for example.

Figure 6C:
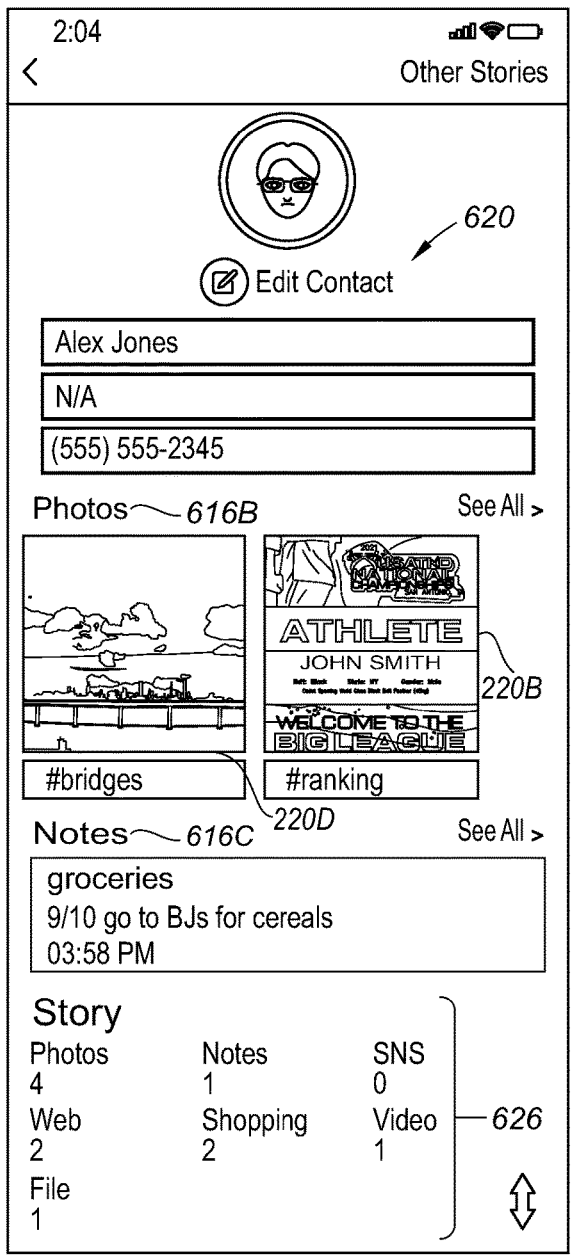

As particularly illustrated in FIG. 6C, the storyline contents can be summed up in order to illustrate at a glance the content types and their associated contents that are related to the content entry (e.g., contact 620) for which the storyline was generated. The method 600 ends at operation 612.

It should be noted that a storyline can be generated for any other selected content entry of a content type, which can be selected from the plurality of content types 616, as particularly illustrated in FIG. 6A. For example, a storyline can be generated for a certain selected photo from the content type photos 616B, or a certain selected note from content type notes 616C, . . . , a certain selected video from content type videos 616G, . . . , or a certain selected email from content type emails 616L, etc. The content types and their associated contents, which are related to and make up the storyline for the selected content type might be different based on which content type was originally selected, i.e., disparate content type and their associated contents may be included in storylines of photos, notes, videos, emails, etc. However, what is important to note is that each storyline for a selected content type will include at least one other content type and its associated contents.

FIGS. 6A-6D illustrate example pages to generate a storyline in connection with a selected content entry of a selected content type from a plurality of content types, in accordance with FIG. 6.

Upon user executing the content application 316, a homepage 614 is displayed, as particularly illustrated in FIG. 6A. In one example, the user can select a content type (e.g., address book 616A) from a plurality of content types 616 that are managed by the content application 316. As illustrated in FIG. 6B, a list of content entries (e.g., contacts 618) that are associated with the selected content type (e.g., address book 616A) is thus displayed. As further illustrated in FIG. 6B, the user can select a certain content entry (e.g., contact 620) from the list of contacts of the address book 616A, or can search (e.g., using a full/partial search) for a certain contact from the list of available contacts using a search function 622. A total number of content entries (contacts) is shown as reference no. 624 in FIG. 6B. It should be noted that similar pages can be displayed for content entries in connection with the other content types 616 that might be selected, thus enabling user selection of a content entry as described.

Upon the user selection of the content entry (e.g., contact 620), the content application 316 generates a storyline for the selected content entry. In particular, the storyline can include information about the content entry (e.g., name, tel. no., etc. about the contact 620), and one or more other content types and their associated contents, which were previously associated with and/or related to the selected content entry (e.g., contact 620), as displayed on a page illustrated in FIGS. 6C and 6D. For example, for the selected contact 620, contents of other content types are retrieved using records 500 of application database 406, and displayed in the storyline as generated, such as photos content type 618B and associated content photos 220B, 220D, notes content type 616C and related note contents, Web content type 618D and related web contents, shopping content type 618I and related shopping contents (e.g., webpages), videos content type 618G and related video contents, files content type 618K and related file contents (e.g., files), as well as any other content type of content types 616 and its related contents, as particularly illustrated in FIG. 6A. For example, as shown in FIGS. 6C and 6D, only certain content types 626 from the content types 616 were associated with the content entry (e.g., contact 620), and accordingly are the only ones shown in the storyline for the selected contact 620.

As particularly illustrated in the storyline of FIG. 6C, the content types 626 and their contents are summed up or tallied to illustrate at a glance a story of the content types and their contents, associated with the content entry (e.g., contact 620) for which the storyline was generated. It should be noted that where a content type includes multiple contents, only several might be shown for clarity with the others displayable by the user clicking on "see all" in FIGS. 6C and 6D. For example, the user can click on "see all" for the content type photos 618B, wherein all content entries (e.g., photos) that are associated with the content entry (e.g., contact 620) would be shown, such as, for example, photos 220A-220D if associated with contact 620, as illustrated in FIG. 2C. Moreover, a user can return to the homepage 614 using the homepage button 628, or can return through a trail of pages using the back link (e.g., "<") at the top of the pages in FIGS. 6B-6D.

Lastly, a search function 617 as illustrated in FIG. 6A (e.g., at the top right) enables a user to search textual data associated with the content entries of the content types 616 managed by the application 316 for one or more search terms, and to generate a storyline in connection with or related to the search terms across the plurality of content types 616 and their associated content entries, as will be described in greater detail hereinbelow with reference to FIGS. 7 and 7A.

Figure 7:
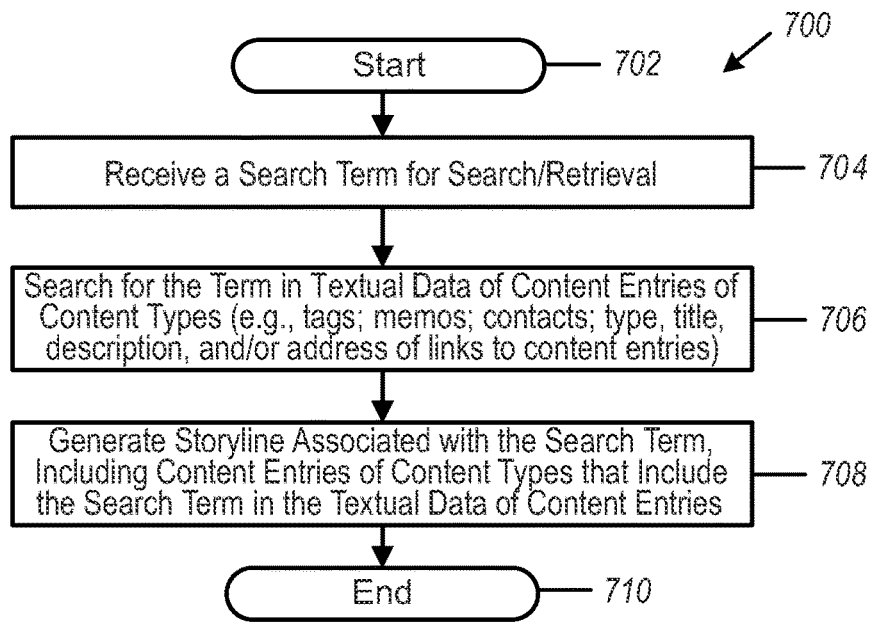
FIG. 7 illustrates a flowchart of an example method of conducting a search of textual data associated with content entries of the content types managed by the content application using the application database, and generating a storyline associated with a search term, wherein the storyline includes content entries of content types resulting from the search.

FIG. 7 illustrates a flowchart of an example search method 700 of conducting a search of textual data associated with content entries of the content types 616 managed by the content application 316 using the application database 406, and generating a storyline associated with a search term of the search, wherein the storyline includes content entries of content types resulting from the search. The example method 700 starts at operation 702, wherein a user clicks on the search function 617 as illustrated in FIG. 6A, in order to conduct the search of all content entries associated with the content types 616 that are maintained in database 406 or on the computing device (e.g., computing device 402) by the content application 316. In response, a page 712 is displayed, as particularly illustrated in FIG. 7A.

At operation 704, there is received a search term for conducting a search of textual data associated with content entries of the content types 616 managed by the content application 316. As an example, the user enters the search term "conservative" into the search field 718 on page 712, and then presses the return key or clicks the search glass in order to conduct the search, as illustrated in FIG. 7A. At operation 706, a search of the contents of the content types 616 maintained by the application 316 in application database 406 is thus conducted, e.g., searching any textual data indicated by or associated with the content entries of the content types 616 (e.g., searching for the search term in any textual data of tags; memos; contacts; as well as in basic info: including type, title, description, and URL address of a link to a content entry).

Thereafter, at operation 708, a storyline that is associated with the search term is generated, which includes contents (content entries) of all content types that include the search term in the textual information associated with the contents. For example, page 712 displays a storyline 720 that includes content types Web 618D and associated content entries (e.g., webpages) related by the tag "conservative", as illustrated in FIG. 7A. It should be noted that page 712 can include all contents (content entries) of all content types that include the search term in textual data of the content entries, such as, for example, any content entries of the content types 616 as illustrated on page 614 of FIG. 6A. The example method 700 ends at operation 710.

Figure 7A:
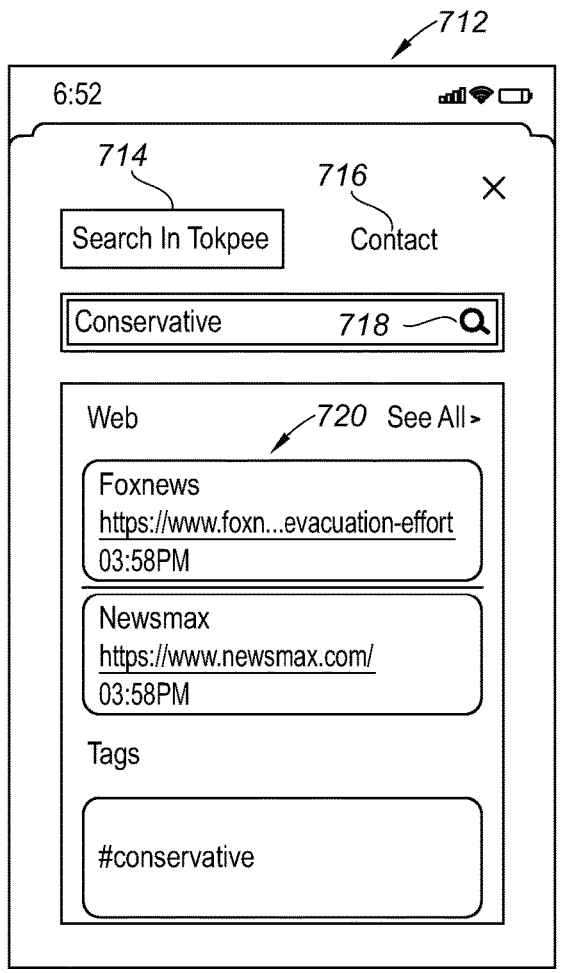
FIG. 7A illustrates an example page to conduct an example search of the contents (content entries) of one or more content types managed by the content application, and to generate a storyline that includes one or more content entries resulting from the search.

FIG. 7A illustrates an example page 712 to conduct an example search of the contents (e.g., content entries) of one or more content types 616 managed by the content application 316, and to generate a storyline 720 that includes one or more content entries resulting from the search. In one embodiment, the search can be executed for all content entries of all content types 616, as illustrated in FIG. 6A. In another embodiment, the search can be executed for all content entries (e.g., contacts) of a certain content type (e.g., address book 616A), as particularly illustrated in FIG. 6A. In this regard, the page 712 includes a selection of a type of search to be conducted, such as a search of all contents 714 of the content application 316 (e.g., content entries of content types 616), or a search of contents associated with a certain content type (e.g., contact) 716. As illustrated in page 712, a search of all contents of the content application is selected at selection 714, and search of contents associated with a certain content type (e.g., contact) is selected at selection 716.

Upon selection of the search type, the search term associated with the search term can be entered into search field 718, and the search conducted pressing the enter key or clicking the search glass, as illustrated in FIG. 7A. The search term being searched can be included in textual data (text fields) of any one or more of the tags, memos, contacts, and/or basic info: type, title, and description associated with a content entry, and/or can be included in the link to the content entry (e.g., included in or associated with the URL for the content entry).

In one example of searching contents to generate storyline in connection with the search term, the user enters "conservative" into the search field 718, and executes the search (e.g., pressing return or clicking search glass), as illustrated in FIG. 7A. The search is conducted, e.g., searching any textual information indicated by the contents (content entries) of the different content types (e.g., tags; memos; contacts; and basic info: including type, title, description, and addresses of links to the content entries). A storyline associated with the search term is thus generated, which includes all content types and content entries for each of the content types, which include the search term in any textual information associated with the content entries. For example, the page 712 displays a storyline 720 that includes content types Web 618D and associated content entries (e.g., webpages) related by the tag "conservative", as illustrated in FIG. 7A. Similarly, the storyline 720 can include one or more other content entries of content types 616 as illustrated in FIG. 6A. For example, the generated storyline 720 can include photos, notes, SNS posts, files, emails, etc., which may include the search term in the textual data.

Figure 6D:
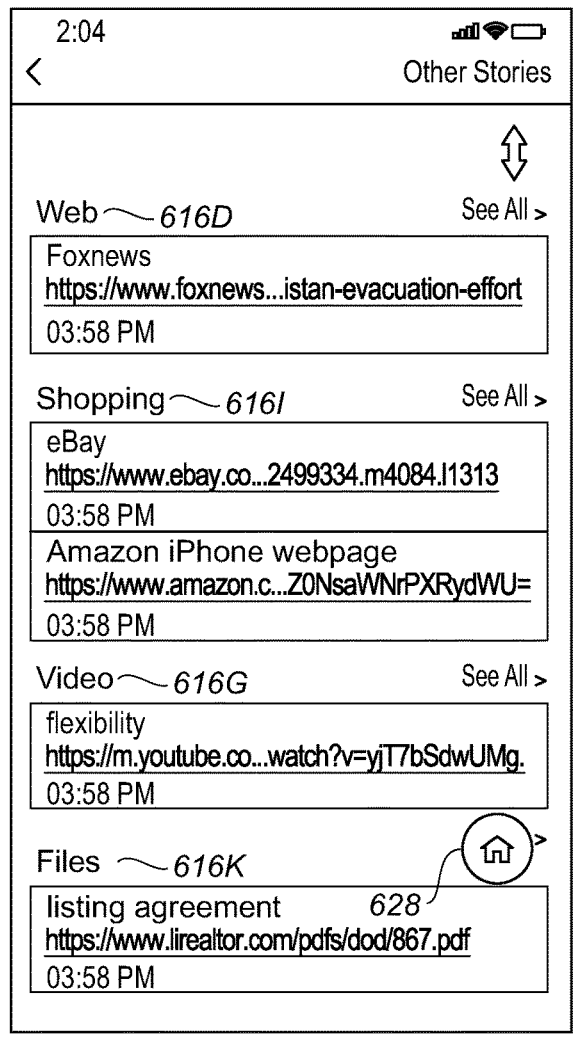

A user can select by clicking the content type (Web), or the title (e.g., Foxnews or Newsmax), or the tag (e.g., "conservative"), which generates a further storyline associated with a first available contact that includes the clicked content type, title, or tag, such as, for example, as illustrated in FIGS. 6C and 6D. Moreover, upon clicking any link in the storyline 720 (e.g., Foxnews link or Newsmax link), the application 316 can then open the content indicated by the clicked link, e.g., opening a webpage indicated by the Newsmax link in a web browser.

If the user decides to execute a search of a certain content entry (e.g., a contact) by selection of search 716, the content application 316 thus allows the user to select a contact (e.g., contact 620) such as via page 616A in FIG. 6B, and then to conduct search of the content entries of the selected contact for a search term entered into search field 718, as described already hereinabove. The search result would thus be a storyline, such as storyline 720, associated with the contact in connection with the search term.

Figure 8:
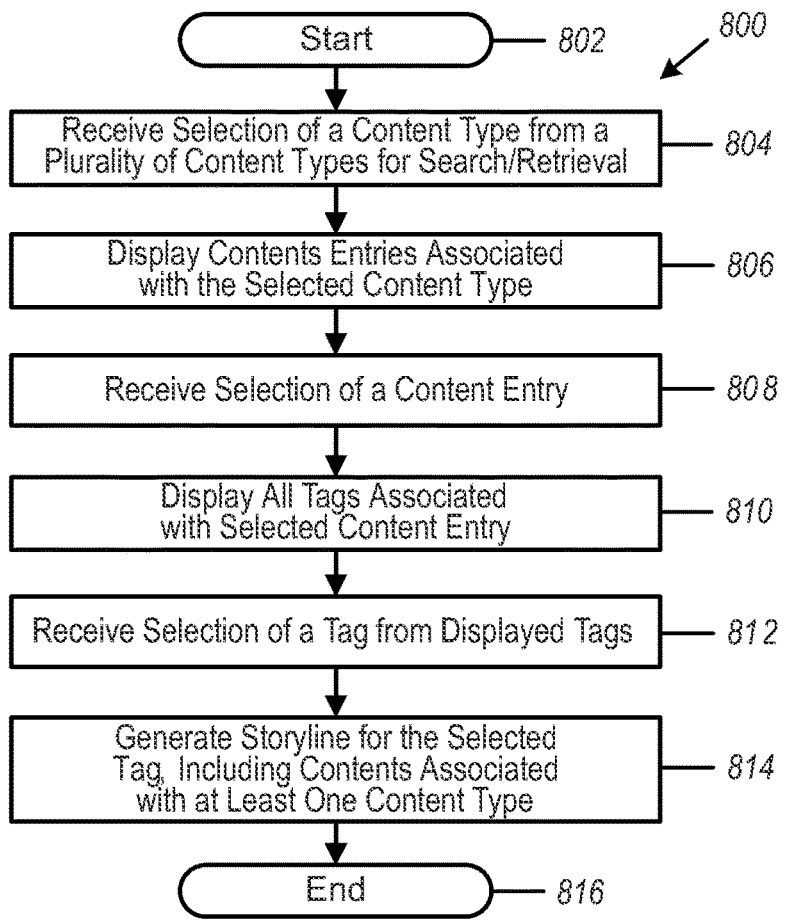
FIG. 8 illustrates a flowchart of an example method of generating a storyline from a content (content entry) that is associated with another storyline, wherein the storylines have a shared content history.

FIG. 8 illustrates a flowchart of an example method 800 of generating a storyline from a content (e.g., content entry) that is associated with another storyline, wherein the storylines have a shared content history.

At operation 802, the example method 800 starts. At operation 804, there is received a selection of a content type from a plurality of content types for search/retrieval. For example, a user selects photos 616B from the content types 616, as particularly illustrated in FIG. 6A. At operation 806, there are displayed content entries associated with the selected content type. For example, a page 818 displays the content entries (e.g., photos), as illustrated in FIG. 8A. At operation 808, there is received a selection of a content entry. For example, content entry (e.g., photo 220B) is selected, as shown in FIG. 8A.

At operation 810, the contacts and/or tags that are tagged to or associated with the selected content entry (e.g., photo 220B) are displayed in connection with the selected content entry. For example, a tag "ranking" 624 and several contacts "Alex Jones" and "John Smith" tagged to the photo 220B, indicated as respective nos. 620 and 622, are displayed as in association with the photo 220B. At operation 812, there is received a selection of a tagged data, such as a contact 620, 622 or a tag 624 from the displayed content entry 220B.

Thereafter, at operation 814, there is generated a storyline for the selected tagged data, including contents (e.g., content entries) associated with at least one content type. In one example, upon selection of a contact 620 or contact 820 in FIG. 8B, there is generated a storyline for the selected contact 620 or a storyline for the selected contact 820, including the content entries associated with at least one content type. For example, the storyline for contact 620 is illustrated in FIGS. 6C and 6D, and the storyline for contact 820 is illustrated in FIGS. 8C and 8D. In particular, the storyline for contact 620 includes associated contact information, a certain set of content types and associated content entries, and a story summary, as illustrated in FIGS. 6C and 6D, while storyline for contact 820 includes associated contact information, and a certain other set of content types and associated content entries, and a story summary, as illustrated in FIGS. 8C and 8D. Because the content entry (e.g., photo 220B) is associated with the several contacts 620, 820, the aforementioned contacts have a shared content history that includes, for example, the shared content entry (e.g., photo 220B). It should be noted content entries of various content types can make up the shared history among the contacts 620, 820. Moreover, it should be noted that the aforementioned storylines for contacts 620, 820 have a shared content history.

Figure 8B:
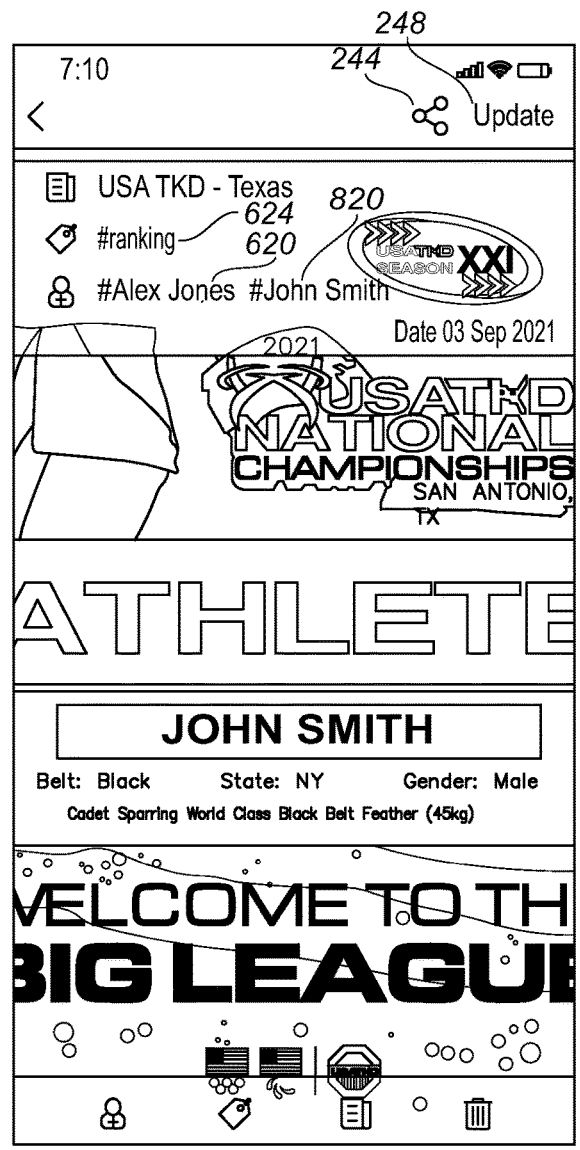
FIGS. 8A-8D illustrate example pages to generate a storyline from a content entry associated with another storyline, wherein the storylines have shared content history in accordance with FIG. 8.
Figure 8A:
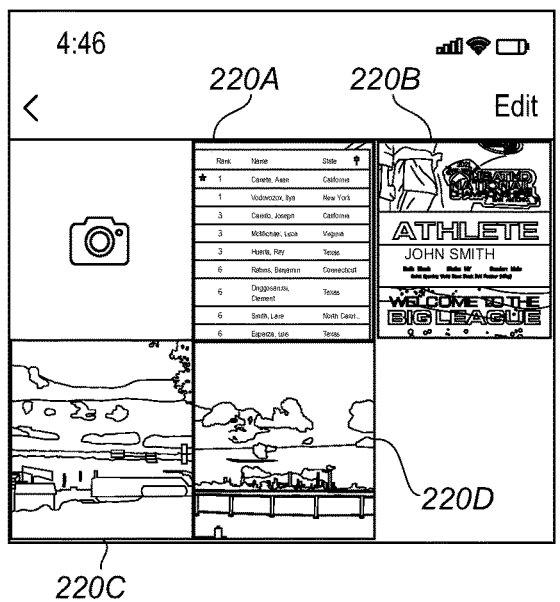
Figure 8C:
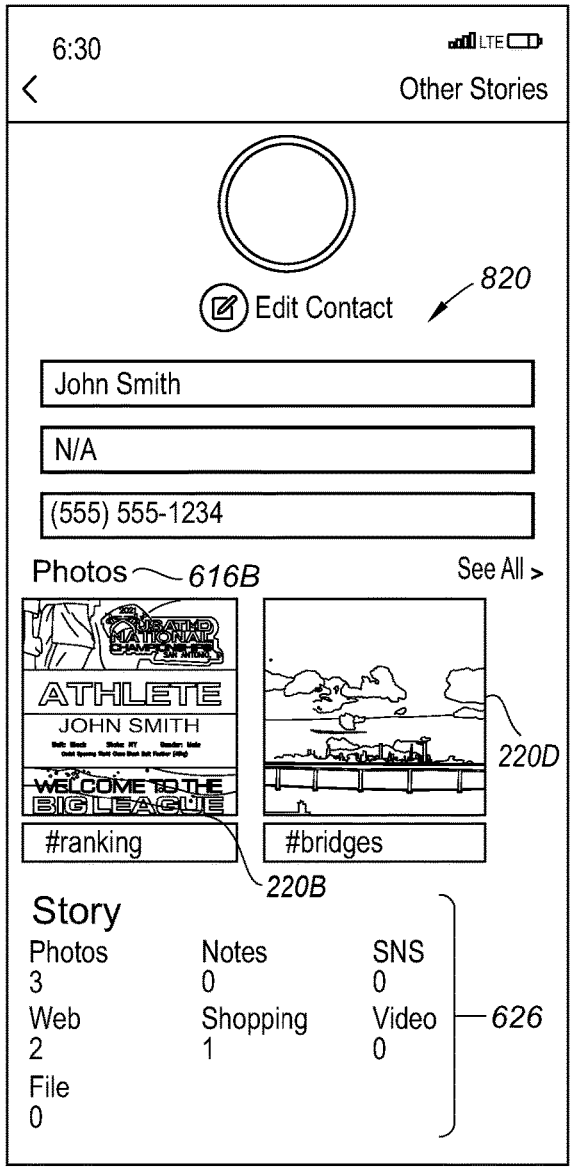
Figure 8D:
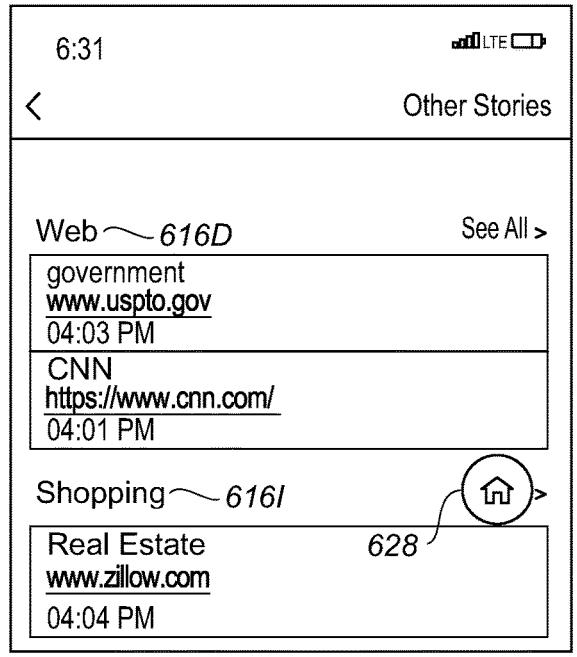

In another example, upon selection of a tag 624 in FIG. 8B, there is generated a storyline for the selected tag 624, including contents (content entries) that are associated with at least one content type that have been tagged with the selected tag 624. For example, photos 220A and 220B, which are illustrated in FIG. 8A, have been associated with a tag "ranking" that is in common among them, and can thus be retrieved (not shown) in connection with the generation of the storyline for the tag "ranking" 624, in addition to any other content entries associated with the tag "ranking" 624, wherein the content entries can be of different content types 616, as particularly illustrated in FIG. 6A. It should be noted that the content types and associated contents that form the generated storyline are not exhaustive and/or limited to the aforementioned photos, and thus any other contents of the application 316 that have been tagged with a tag 624 can be retrieved and can thus form the storyline for tag 624. It should be noted that the aforementioned storylines for the contacts 620, 820, and the storyline for the tag 624 have a shared content history.

FIGS. 8A-8D illustrate example pages to generate a storyline from a content entry associated with another storyline, wherein the storylines have shared content history in accordance with FIG. 8.

In one example, a user can select photos 616B from other content types 616, as particularly illustrated in FIG. 6A. The application 316 presents a page 818 that displays photos 220A-220D, particularly as illustrated in FIG. 8A. As an example, the user can select photo 220B from the photos displayed on page 818.

As illustrated in FIG. 8B, any contacts 620, 820 and/or any tags 624 that are tagged to or associated with the selected photo 220B are displayed in connection with the photo 220B. As an example, the user can select contact 620 from the photo 220B.

As particularly illustrated in FIGS. 6C and 6D, a storyline is generated for the selected contact 620, wherein the storyline includes various contents associated with at least one content type, e.g., contents types 618B, 616C, 618D . . . , 618K. Because the photo 220B is a shared content of content type photos 616, among the contacts 620 and 820, the user can instead select contact 820 from photo 220B in FIG. 8B, wherein a storyline is generated for the selected contact 820, as particularly illustrated in FIGS. 8C and 8D.

It should be noted that, while the storylines of contacts 620 and 820 are different in part, it can be said that the aforementioned storylines overlap in certain content or have certain shared content history. For example, the storyline for contact 620 is illustrated in FIGS. 6C and 6D, and the storyline for contact 820 is illustrated in FIGS. 8C and 8D. As illustrated in the aforementioned figures, photo 220B and 220D are associated with the contacts 620 and 820, and thus the aforementioned contacts 620, 820 overlap or have a certain shared content history in photos 220B and 220D. It should further be noted that other contents of various content types can overlap and can thus be included in the shared content history of the multiple contacts.

In another example, with reference to the storyline for contact 620 as illustrated in FIGS. 6C and 6D, which can be generated as described herein, the user can select photo 220B of content type 618B. Upon selection, the page of FIG. 8B is presented for the selected photo 220B, showing associated contacts 620 and 820, as well as associated tags 624. As an example, the user can select contact 820, and the storyline for contact 820 can thus be generated as described herein, and as particularly illustrated in FIGS. 8C and 8D.

While the generation of storylines using shared contents has been illustrated using photos for brevity and clarity, it should be noted that the shared contents (e.g., content entries) of any other content types 616, such as illustrated in FIG. 6A can similarly overlap in shared content histories of various storylines generated as disclosed herein. Accordingly, the shared contents can be used for the generation of and switching among the various storylines that include shared contents.

Figure 9:
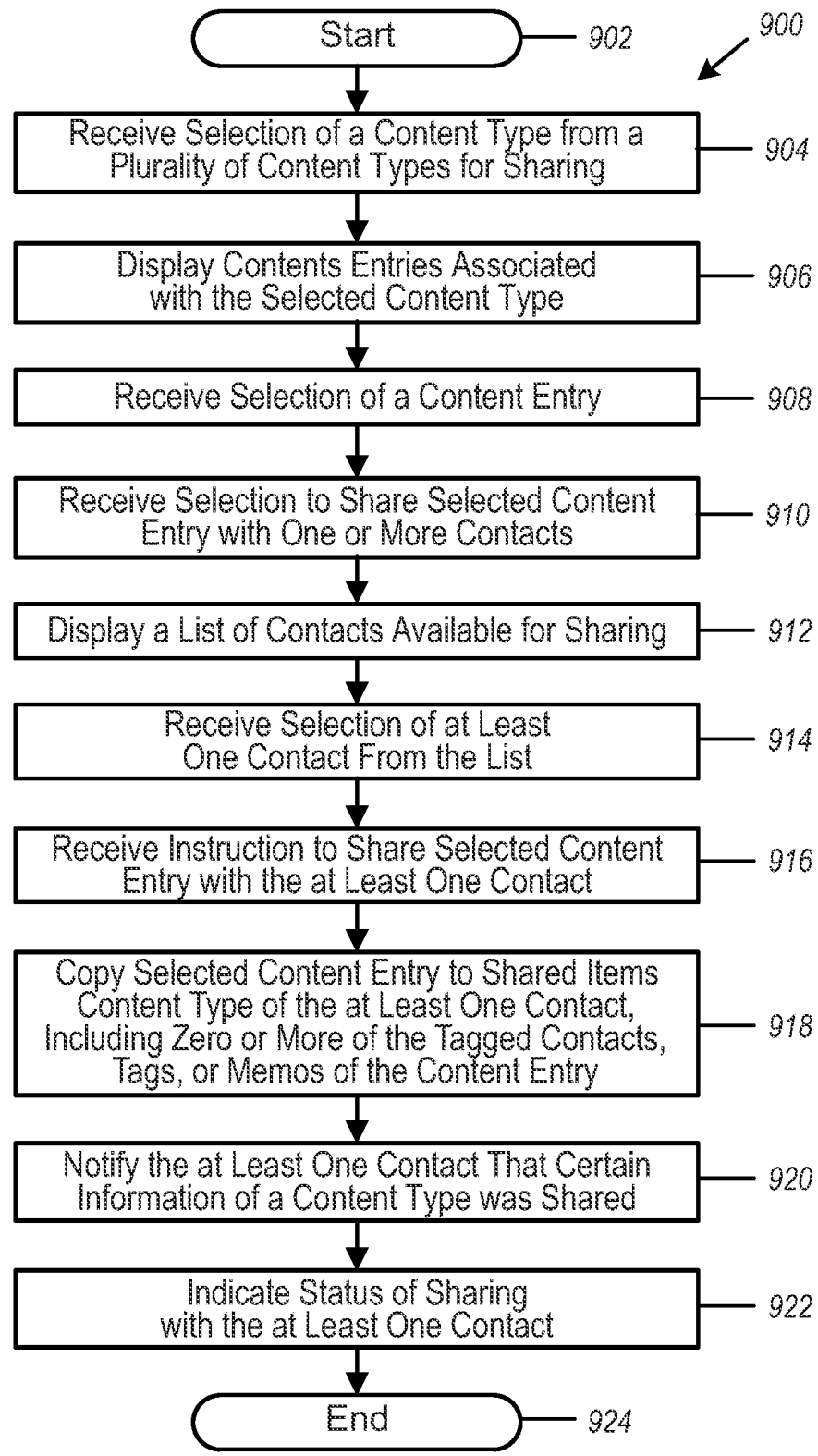
FIG. 9 illustrates an example method of sharing a selected content entry with at least one selected contact, including one or more of the tagged contacts, tags, and/or memos associated with the selected content entry.

FIG. 9 illustrates an example method 900 of sharing a selected content entry from the content application 316 of one computing device 402 with a content application 316 of another computing device 403 as associated with a selected contact, including zero or more of the tagged contacts, tags, and/or memos associated with the selected content entry.

The method 900 start at operation 902, wherein a user executes the content management and relationship application 316 (e.g., tokpee) on the computing device 402. At operation 904, a selection is received of a content type of contents (e.g., content entries) for sharing, from a plurality of available content types. For example, the content type can be contacts, photos, notes, web pages, etc. as described hereinabove with reference to content types 616 of the content management application 316, as particularly illustrated in FIG. 6A. For example, a selection of a content type "photos" 616B is received as illustrated in FIG. 6A.

At operation 906, the contents entries that are associated with the selected content type are displayed. For example, photos 220A-220D or links to these photos are received from the application server/content provider 404, wherein the photos or links to the photos are stored in the application database 406, as illustrated in FIG. 4. At operation 908, a selection of a content entry is received from the displayed content entries. For example, the user can select photo 220D, as particularly illustrated in FIG. 2C. In this regard, it should be noted that none or one or more associations can be or are tagged to the content photo 220D, as described herein with reference to FIGS. 2A-2H. For example, the photo 220D illustrated in FIG. 2D does not have any associations tagged to the photo 220D, while the photo 220D illustrated in FIG. 2H includes various posted associations that are tagged to the content photo 220D, including contacts 246, tags 262, and memos 270.

At operation 910, a selection to share the selected content entry (e.g., photo 220D) with one or more contacts is received. For example, a user can select a share button 244, as particularly illustrated in FIG. 2H. At operation 912, a list of contacts that are available for sharing the photo 220D is displayed. For example, the list of contacts 618 of address book 616A can be displayed, as particularly illustrated in FIGS. 6B and 9A. At operation 914, a selection of at least one contact is received from the list of contacts 618. For example, any one or several contacts 902, 904, 620 of the contacts 618 can be selected, as particularly illustrated in FIG. 9A. At operation 916, an instruction to share the selected content entry (e.g., photo 220D) with the selected at least one contact is received. For example, the share instruction can be indicated by the selection of a share button 906 at the bottom of the list of contacts, or sharing can be canceled by selection of the cancel button 908, as particularly illustrated in FIG. 9A.

At operation 918, the selected content entry is copied to shared items content type 616M of the selected at least one contact (e.g., a contact can be associated with computing device 403, and other contacts can be associated with respective computing devices in the system 400, as particularly illustrated in FIG. 6A), including zero or more of the tagged contacts, tags, or memos of the selected content entry. For example, the selected content entry and any associations tagged to the content entry (e.g., photo 220D) can be copied to the application database 406 of application server/content provider 404 in connection with the computing devices of the selected contacts (e.g., computing device 403 associated with a certain contact). Moreover, zero or more of the tagged contacts, tags, or memos of the selected content entry can also be copied to application database 406 in association with the copied content entry. At operation 920, the selected at least one contact is notified that certain information of a certain content type was shared. For example, a notification can be transmitted to the computing device 403 (e.g., an email message, a text message, or another type of message or notification). In one embodiment, the notification (e.g., text message) can include a link that will automatically execute the content application 316 on computing device 403, or require that the content application 316 first be installed if not already and execute the content application 316, and then will automatically select the content type "shared "items" 616M, resulting in the automated display of the content entry on the computing device 403. Lastly, at operation 922 a status of the sharing with the at least one contact can be indicated to the user of the computing device 402, as particularly illustrated in FIG. 6B. The example method 900 ends at operation 924.

FIGS. 9A and 9B illustrate example pages to share a selected content entry from the content application 316 of one computing device 402 with a content application 316 of another computing device 403 as associated with a selected contact, including one or more of the tagged contacts, tags, and/or memos associated with the selected content entry, in accordance with FIG. 9. For example, the selected content entry can be shared by a user of the computing device 402 with a user of the computing device 403 in system 400, as particularly illustrated in FIG. 4.

Upon a user executing the content management and relationship application (e.g., tokpee) 316 on the computing device 402, a homepage 616 of the content application 316 is displayed, as illustrated in FIG. 6A. The user can then select a content type (e.g., photos 616B) from a plurality of content types, such as content types 616A to 616L. For example, the user can select a content type "photos" 616B.

After selection of the "photos" content type, the photos or links to the 220A-220D are received at the computing device 402 from the application server/content provider 404, or are selected if the photos are stored on the mobile device 402. The user can select a content entry (e.g., photo) from the content type photos 616B, such as photo 220D, from the plurality of displayed photos to share with a contact, as particularly illustrated in FIG. 2C. As described hereinabove, one or more associations can be tagged to the content photo 220D, as described herein with reference to FIGS. 2A-2H. For example, the photo 220D illustrated in FIG. 2D does not have any tagged associations, while the photo 220D illustrated in FIG. 2H includes various tagged associations, including contacts, tags, and/or memos.

Upon selection of the content entry (e.g., photo), the photo 220D can be displayed as illustrated in FIG. 2H. In order to share the photo 220D with a contact, the user can select the share button 244 as illustrated in FIG. 2H. Upon selection of the share button 244, a list of contacts 618 available for sharing the photo 220D can be displayed, as illustrated in FIGS. 6B and 9A. The user can select at least one contact from the list of contacts 618, such as contacts 902, 904, and 620, as particularly illustrated in FIG. 9A. The user can provide instruction to share the content entry (e.g., photo 220D) with the one or more selected contacts by selecting the share button 906, or can provide instruction to cancel sharing by selection of the cancel button 908, which can be provided at the bottom of the list 618, as particularly illustrated in FIG. 9A.

Upon receiving the aforementioned share instruction, the selected content entry (e.g., photo 220D) or link to the content entry is copied to shared items content type 616M of the at least one selected contact by the application server/content provider 404, along with one or more of the tagged associations. For example, the selected photo 220D or link to the photo 220D is copied into the application database 406 for a selected contact (e.g., selected contact 620 being associated with computing device 403, while the other selected contacts being associated with respective computing devices in the example system 400 as illustrated in FIG. 4). More specifically, multiple contacts might be associated with multiple respective computing devices, wherein each of the devices (e.g., computing device 403) is capable of installing/executing the content application 316, as well as retrieving and displaying a copy of the content entry (e.g., photo 220D) shared by computing device 402, along with the various tagged associations, including contacts, tags, and/or memos.

After copying the content entry (e.g., photo 220D) or the link to the content entry, the application server/content provider 404 notifies the selected at least one contact that a certain content has been shared with the at least one contact. For example, the application server/content provider 404 transmits a notification that notifies a contact associated with the respective computing device (e.g., selected contact associated with computing device 403), wherein the notification can be an email message, a text message, or another type of message. Lastly, a status of the sharing with the at least one contact is indicated to the user on the computing device 402, whether the sharing was successful or not. An example indication is illustrated in FIG. 9B, indicating that the sharing of the content with the selected contacts was successful.

It should be noted that—while sharing has been illustrated in connection with a certain content entry (e.g., photo 220D) and associations that might be associated with the content entry—any content entry of a content type 616 as illustrated in FIG. 6A, along with related associations, can be shared from the computing device 402 with contacts of respective computing devices (e.g., computing device 403) that were selected to receive the content entry that is shared.

Figure 10:
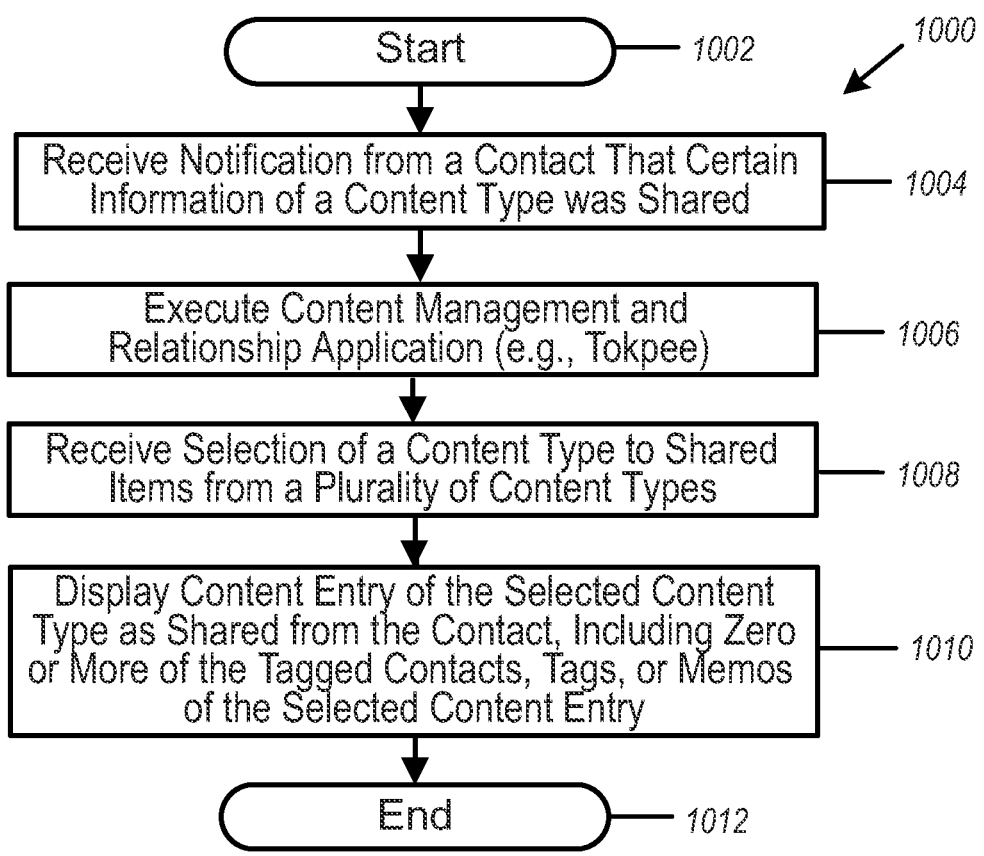
FIG. 10 illustrates an example method of accessing a content entry that was shared with a contact in accordance with FIGS. 9, 9A, and 9B, including one or more tagged associations (contacts, tags, and/or memos associated with the selected content entry)

FIG. 10 illustrates an example method 1000 of accessing a content entry that was shared with a contact in accordance with FIGS. 9, 9A, and 9B, including one or more tagged associations, e.g., contacts, tags, and/or memos associated with the selected content entry. For example, the content entry (e.g., photo 220D) was shared by a user of computing device 402 with a selected contact (user) of the computing device 403.

The method 1000 starts at operation 1002, wherein the user (e.g., selected contact) of the computing device 403 receives a notification (e.g., text message) from the application server/content provider 404 (e.g., via sharing functionality from the computing device 402), indicating that the user has received shared content (e.g., content entry). At operation 1006, the content management and relationship application 316 (e.g., tokpee) is executed on the computing device. If the application is not installed, the user is prompted to install the application 316 on the computing device 403, and the content application 316 is then executed. For example, upon execution of the content application 316, the homepage 614 can be displayed to the user, and displays content types 616, as illustrated in FIG. 6A. At operation 1008, a selection is received of a content type to the shared items from a plurality of content types. For example, the content type shared items 616M is selected from the plurality of content types 616 displayed on the homepage 614, as particularly illustrated in FIG. 6A. At operation 1010, the shared content entry 1016 (e.g., shared photo 220D) is displayed on computing device 403, including one or more of the contacts, tags, or memos of the content entry. For example, the shared content entry (e.g., photo) as displayed on computing device 403 is illustrated in FIG. 10B. In one embodiment, the execution of the content application 316 and the selection of the content type 616M, which result in the display of the content entry 1016 (e.g., shared photo 220D) can be accomplished via user selection, e.g., manually executing the content application 316, selecting the content type 616M, thus resulting in the display of the shared content entry 1016 (e.g., shared photo 220D), as particularly illustrated in FIG. 10B. In another embodiment, the execution of the content application 316 and the selection of the content type 616M, resulting in the display of the content entry 1016 can be executed automatically by the user via selection of a link provided in the notification (e.g., text message) received at the computing device 403. At operation 1012, the example method 1000 ends.

Figure 10A:
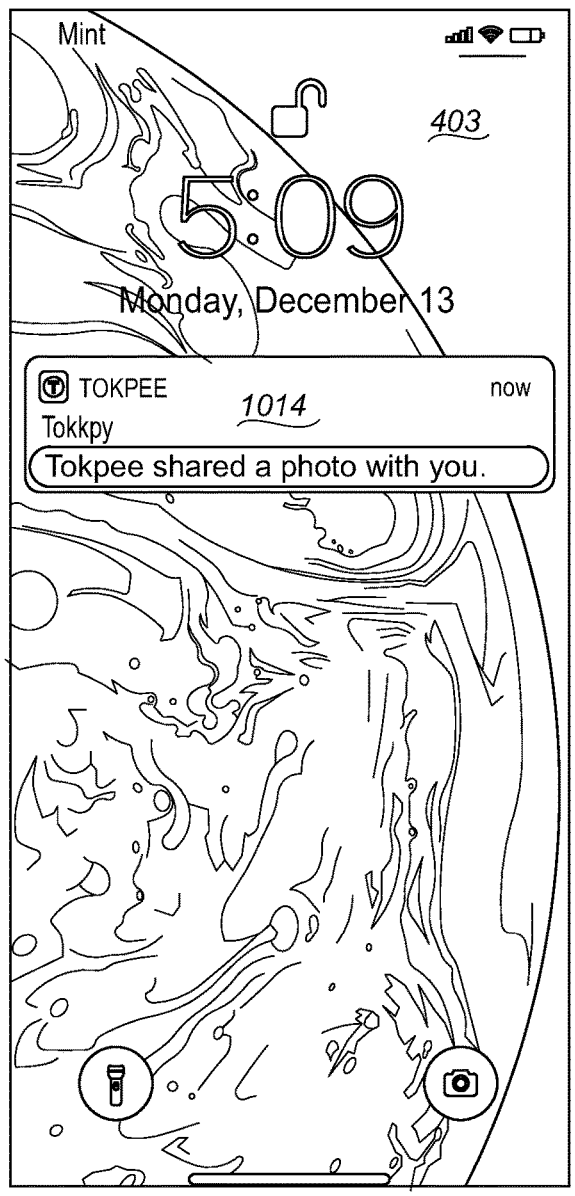
FIGS. 10A and 10B illustrate example pages to access a content entry that was shared with at least one contact in accordance with FIGS. 9, 9A, and 9B, including one or more tagged associations.
Figure 10B:
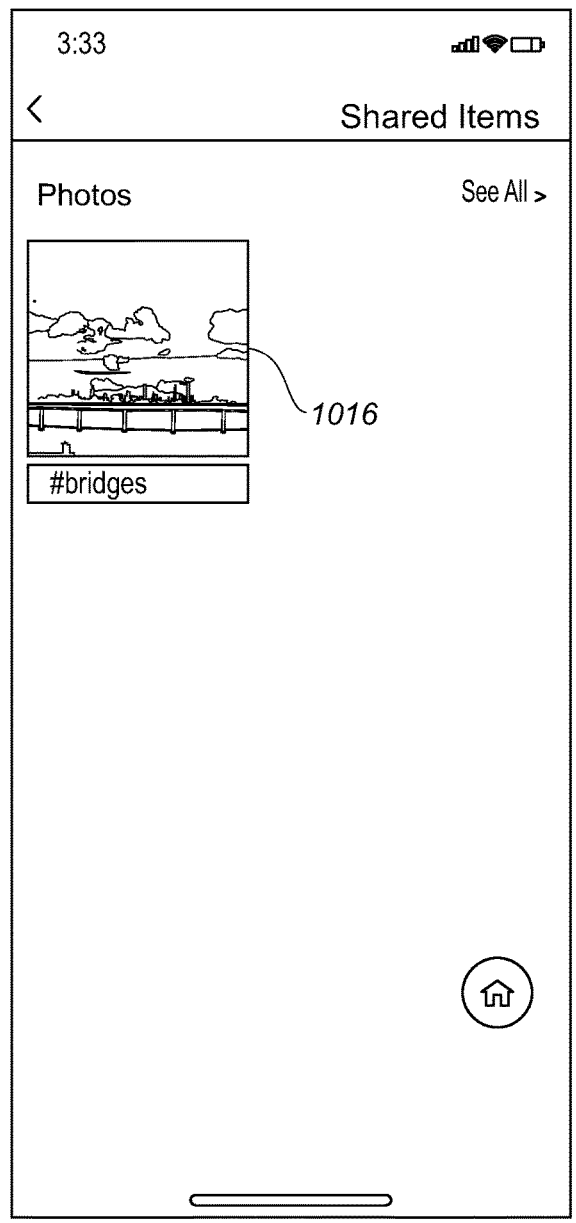

FIGS. 10A and 10B illustrate example pages to access a content entry 1016 that was shared with at least one contact in accordance with FIGS. 9, 9A, and 9B, including one or more tagged associations, e.g., contacts, tags, and/or memos associated with the selected content entry 1016. For example, the shared content entry 1016 (e.g., shared photo 220D) was shared by a user of computing device 402 with a selected contact (user) of the computing device 403.

As illustrated in FIG. 10A, the user (e.g., selected contact) of computing device 403 receives a notification (e.g., text message) 1014 from the application server/content provider 404 (e.g., via sharing functionality from computing device 402), which indicates that the user received shared content (e.g., content entry). In one embodiment, the message 1014 includes a link that can be selected by the user of computing device 403. Upon selection of the link, the content application 316 is automatically executed on the computing device 403, and the content type "shared items" 616M is automatically selected from content types 616, which results in the automated display of the content entry 1016 (e.g., photo 220D shared by computing device 402) on the computing device 403, and can include one or more of the contacts, tags, or memos of the content entry shared by the user of the computing device 402, as illustrated in FIG. 10B. As described hereinabove, if the application is not installed on the computing device 403, the user can be prompted to install the application 316 on the computing device 403, and the content application 316 can then be executed to display the content entry 1016 (e.g., photo 220D shared by computing device 402).

In another embodiment, after receiving a notification (e.g., text message) 1014 from the application server/content provider 404 (e.g., via sharing functionality from computing device 402), the user can manually execute the content management application 316 on the computing device 403. Upon execution of the content application 316, the homepage 614 can display the content types 616, as particularly illustrated in FIG. 6A. The user can manually select the content type "shared items" 616M from a plurality of content types 616, as particularly illustrated in FIG. 6A. The shared content entry 1016 (e.g., shared photo 220D) 1016 is then displayed, and can include one or more of the contacts, tags, or memos of the content entry shared by the user of the computing device 402.

Figure 11:
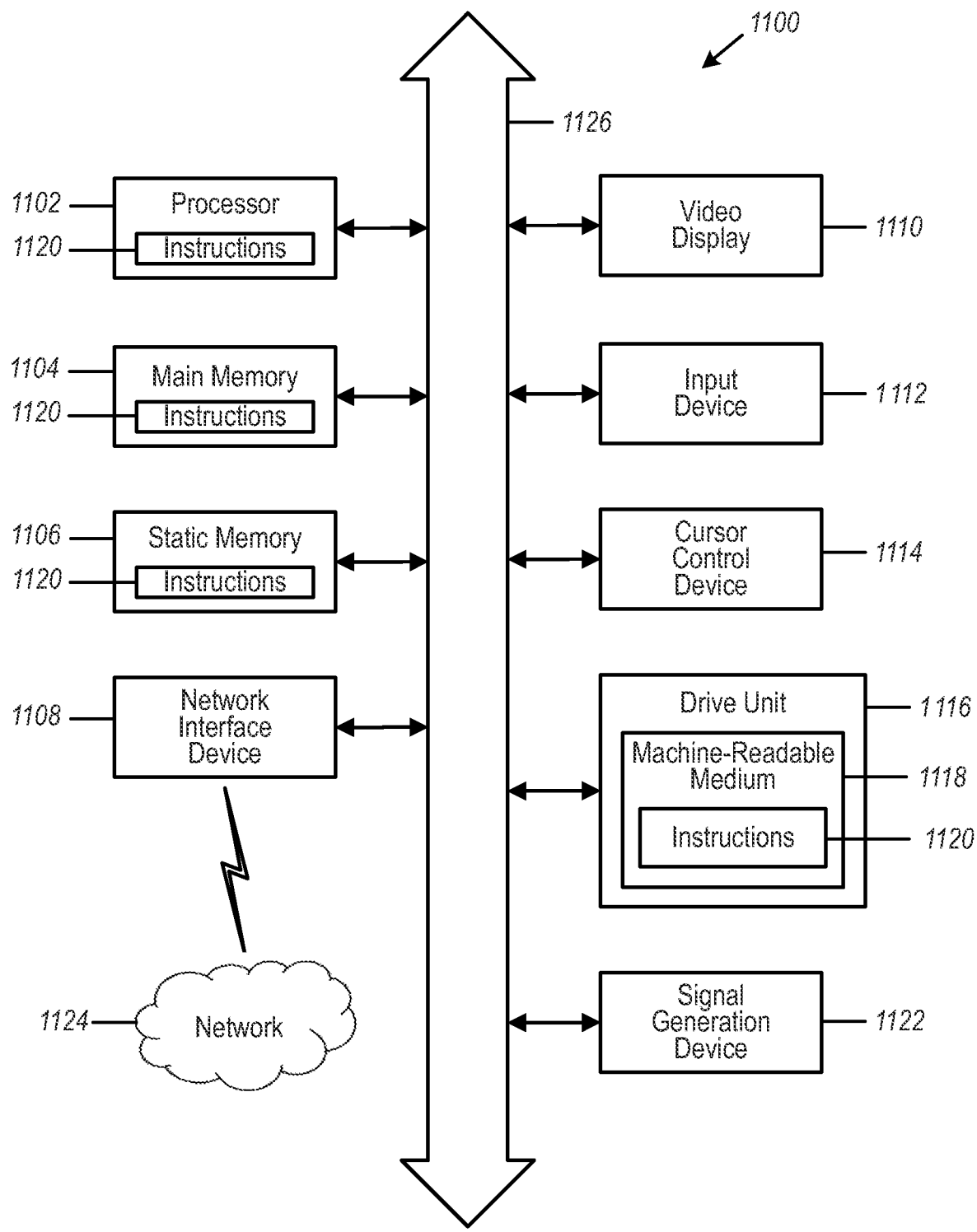
FIG. 11 illustrates a block diagram of an example general computer system.

FIG. 11 is a block diagram of an illustrative embodiment of a general computer system 1100. The computer system 1100 can include a set of instructions that can be executed to cause the computer system 1100 to perform any one or more of the methods or computer based functions disclosed herein in FIGS. 1-10B. The computer system 1100, or any portion thereof, may operate as a standalone device or may be connected, e.g., using a network or other connection, to other computer systems or peripheral devices. For example, the computer system 1100 may be a computing device 402 or a computing device 403 that can execute the content management and relationship application 316 (e.g., tokpee), and may further be connected to other systems and devices, such as application server/content provider 404 and application database 406, as well as content providers 408-416, via a network such as the network 418.

The computer system 1100 may also be implemented as or incorporated into various devices, such as a personal computer (PC), a tablet PC, a personal digital assistant (PDA), a computing device or mobile device (e.g., smartphone), a palmtop computer, a laptop computer, a desktop computer, a communications device, a control system, a web appliance, or any other machine capable of executing a set of instructions (sequentially or otherwise) that specify actions to be taken by that machine. Further, while a single computer system 1100 is illustrated, the term "system" shall also be taken to include any collection of systems or sub-systems that individually or jointly execute a set, or multiple sets, of instructions to perform one or more computer functions.

As illustrated in FIG. 11, the computer system 1100 may include a processor 1102, e.g., a central processing unit (CPU), a graphics-processing unit (GPU), or both. Moreover, the computer system 1100 may include a main memory 1104 and a static memory 1106 that can communicate with each other via a bus 1126. As shown, the computer system 1100 may further include a video display unit 1110, such as a liquid crystal display (LCD), an organic light emitting diode (OLED), a flat panel display, a solid state display, or a cathode ray tube (CRT). Additionally, the computer system 1100 may include an input device 1112, such as a keyboard, and a cursor control device 1114, such as a mouse. The computer system 1100 can also include a disk drive (or solid state) unit 1116, a signal generation device 1122, such as a speaker or remote control, and a network interface device 1108.

In a particular embodiment or aspect, as depicted in FIG. 11, the disk drive (or solid state) unit 1116 may include a computer-readable medium 1118 in which one or more sets of instructions 1120, e.g., software, can be embedded. Further, the instructions 1120 may embody one or more of the methods or logic as described herein. In a particular embodiment or aspect, the instructions 1120 may reside completely, or at least partially, within the main memory 1104, the static memory 1106, and/or within the processor 1102 during execution by the computer system 1100. The main memory 1104 and the processor 1102 also may include computer-readable media.

In an alternative embodiment or aspect, dedicated hardware implementations, such as application specific integrated circuits, programmable logic arrays and other hardware devices, can be constructed to implement one or more of the methods described herein. Applications that may include the apparatus and systems of various embodiments or aspects can broadly include a variety of electronic and computer systems. One or more embodiments or aspects described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments or aspects, the methods described herein may be implemented by software programs tangibly embodied in a processor-readable medium and may be executed by a processor. Further, in an exemplary, non-limited embodiment or aspect, implementations can include distributed processing, component/object distributed processing, and parallel processing. Alternatively, virtual computer system processing can be constructed to implement one or more of the methods or functionality as described herein.

It is also contemplated that a computer-readable medium includes instructions 1120 or receives and executes instructions 1120 responsive to a propagated signal, so that a device connected to a network 1124 can communicate voice, video or data over the network 1124. Further, the instructions 1120 may be transmitted or received over the network 1124 via the network interface device 1108.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, example embodiment or aspect, the computer-readable medium can include a solid-state memory, such as a memory card or other package, which houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals, such as a signal communicated over a transmission medium. A digital file attachment to an e-mail or other self-contained information archive or set of archives may be considered a distribution medium that is equivalent to a tangible storage medium. Accordingly, any one or more of a computer-readable medium or a distribution medium and other equivalents and successor media, in which data or instructions may be stored, are included herein.

In accordance with various embodiments or aspects, the methods described herein may be implemented as one or more software programs running on a computer processor.

Dedicated hardware implementations including, but not limited to, application specific integrated circuits, programmable logic arrays, and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, a tangible storage medium or distribution medium as listed herein, and other equivalents and successor media, in which the software implementations herein may be stored, are included herein.

Thus, a system and method associated with effectively managing relationships, organization, retrieval, and sharing of different types of content accessible by a computing device, such as a mobile device have been described. Although specific example embodiments or aspects have been described, it will be evident that various modifications and changes may be made to these embodiments or aspects without departing from the broader scope of the invention. Accordingly, the specification and drawings are to be regarded in an illustrative rather than a restrictive sense. The accompanying drawings that form a part hereof, show by way of illustration, and not of limitation, specific embodiments or aspects in which the subject matter may be practiced. The embodiments or aspects illustrated are described in sufficient detail to enable those skilled in the art to practice the teachings disclosed herein. Other embodiments or aspects may be utilized and derived therefrom, such that structural and logical substitutions and changes may be made without departing from the scope of this disclosure. This Detailed Description, therefore, is not to be taken in a limiting sense, and the scope of various embodiments or aspects is defined only by the appended claims, along with the full range of equivalents to which such claims are entitled.

Such embodiments or aspects of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments or aspects have been illustrated and described herein, it should be appreciated that any arrangement calculated to achieve the same purpose may be substituted for the specific embodiments or aspects shown. This disclosure is intended to cover any and all adaptations or variations of various embodiments or aspects. Combinations of the above embodiments or aspects, and other embodiments or aspects not specifically described herein, will be apparent to those of skill in the art upon reviewing the above description The Abstract is provided to comply with 37 CFR § 1.72(b) and will allow the reader to quickly ascertain the nature and gist of the technical disclosure. It is submitted with the understanding that it will not be used to interpret or limit the scope or meaning of the claims.

In the foregoing description of the embodiments or aspects, various features are grouped together in a single embodiment for the purpose of streamlining the disclosure. This method of disclosure is not to be interpreted as reflecting that the claimed embodiments or aspects have more features than are expressly recited in each claim. Rather, as the following claims reflect, inventive subject matter lies in less than all features of a single disclosed embodiment or aspect. Thus the following claims are hereby incorporated into the Detailed Description, with each claim standing on its own as a separate example embodiment or aspect. It is contemplated that various embodiments or aspects described herein can be combined or grouped in different combinations that are not expressly noted in the Detailed Description. Moreover, it is further contemplated that claims covering such different combinations can similarly stand on their own as separate example embodiments or aspects, which can be incorporated into the Detailed Description.

The invention claimed is:

1. A method of managing content entries in association with contacts of an address book using a computing device, the method comprising:
    accessing a content entry from a content source via a link to the content entry, the content source being remote to the computing device;
    adding a contact and at least one of a tag and a memo for association with the content entry;
    posting the contact and the at least one of the tag and the memo in association with link to the content entry, as a record associated with the computing device in a database; and
    displaying the content entry as accessed via the link in association with the contact and the at least one of the tag and the memo as posted, wherein the contact is selectable such that a storyline is generated in connection with the contact as posted, the storyline including one or more links to respective content entries associated with the contact in the database, wherein the one or more links include the link to the content entry as posted, the respective content entries of the storyline being accessible via the one or more links from one or more content sources remote to the computing device.

2. The method according to claim 1, wherein accessing the content entry from the content source comprises:
    receiving a selection of a content type associated with the content entry;
    receiving a selection of a content source associated with the content type;
    receiving a selection of the content entry; and
    returning the link to the content entry.

3. The method according to claim 2, further comprising:
    storing the content entry in the database or on the computing device; and
    returning the link to the content entry stored in the database or on the computing device.

4. The method according to claim 1, wherein accessing the content entry from the content source comprises:
    navigating to a web page in a web browser;
    executing share functionality of the web browser in connection with the web page;
    receiving a selection of a content application in connection with the share functionality; and
    sharing a link associated with the web page with the content application, the link associated with the web page as shared being the link to the content entry.

5. The method according to claim 1, wherein accessing the content entry from the content source comprises:
receiving a selection of a content type associated with the content entry;
receiving a link associated with a web page; and
returning the link associated with the web page, the link associated with the web page as returned being the link to the content entry.

6. The method according to claim 1, further comprising receiving at least one of a type, a title, and a description of a web page associated with a link as returned or shared with the content application, the link as returned or shared being the link to the content entry.

7. The method according to claim 1, further comprising generating the storyline associated with links to the content entries.

8. The method according to claim 7, wherein generating the storyline associated with the links to the content entries comprises:
receiving a selection of an address book content type from a plurality of content types;
receiving a selected contact from a plurality of contacts associated with the address book content type;
retrieving from the database one or more links to respective content entries associated with each of at least one other content type from the plurality of content types, the links of the respective content entries being associated with the selected contact; and
generating the storyline for the selected contact, the storyline including the one or more links to the respective content entries associated with each of the at least one other content type as retrieved, the respective content entries being accessible via the one or more links from one or more content sources remote to the computing device.

9. The method according to claim 8, wherein the respective content entries include one or more of webpages, music, videos, files, social networking services (SNS) posts, really simple syndication (RSS) feeds, photos, notes, emails, direct messaging (DM) messages.

10. The method according to claim 7, wherein generating the storyline associated with the links to the content entries comprises:
receiving a search term;
retrieving from the database one or more links to respective content entries associated with each of at least one content type from a plurality of content types, each of the respective content entries being associated with at least one of the tag, the memo, the contact, a link, or other textual data that includes the search term; and
generating the storyline for the search term, the storyline including the one or more links to the respective content entries associated with each of at least one content type, the respective content entries being accessible via the one or more links from one or more content sources remote to the computing device.

11. The method according to claim 7, wherein generating the storyline associated with the links to the content entries comprises:
receiving a selected tag;
retrieving from the database one or more links to respective content entries associated with each of at least one content type from a plurality of content types, the links of the respective content entries being associated with the selected tag; and
generating the storyline for the selected tag, the storyline including the one or more links to the respective content entries associated with each of the at least one content type as retrieved, the respective content entries being accessible via the one or more links from one or more content sources remote to the computing device.

12. The method according to claim 7, wherein the storyline includes a summation including a number of one or more content entries associated with each of at least one content type as retrieved in connection with the storyline, wherein the storyline is generated based on a selected contact, a selected search term, or a selected tag.

13. The method according to claim 1, further comprising sharing the content entry with a contact of a second computing device.

14. The method according to claim 13, wherein sharing the content entry with the contact of the second computing device comprises:
generating a second record associated with the second computing device in the database;
copying the link to the content entry to the second record, including the at least one of the tag, the memo, or the contact in association with the link; and
notifying the contact of the second computing device that the content entry was shared, wherein the second computing device is capable of displaying the content entry represented by the link and the at least one of the tag, the memo, or the contact.

15. The method according to claim 14, wherein sharing the content entry with the contact of the second computing device comprises:
copying the content entry including the at least one of the tag, the memo, or the contact in association with the content entry to the second computing device;
posting the at least one of the tag, the memo, or the contact in association with a second link to the content entry as copied, as a record associated with the second computing device in the second database; and
notifying the contact of the second computing device that the content entry was shared from a contact of the first computing device, wherein the second computing device is capable of displaying the content entry as copied represented by the second link and the at least one of the tag, the memo, or the contact.

16. A system to manage content entries in association with contacts of an address book, the system comprising:
a computing device;
a non-transitory memory storing instructions that, when executed by the computing device, cause the computing device to execute operations comprising:
accessing a content entry from a content source via a link to the content entry, the content source being remote to the computing device;
adding a contact and at least one of a tag and a memo for association with the content entry;
posting the contact and the at least one of the tag and the memo, or the contact in association with the link to the content entry, as a record associated with the computing device in a database; and
displaying the content entry as accessed via the link in association with the contact and the at least one of the tag and the memo as posted, wherein the contact is selectable such that a storyline is generated in connection with the contact as posted, the storyline including one or more links to respective content entries associated with the contact in the database, wherein the one or more links include the link to the content entry as posted, the respective content entries of the storyline being accessible via the one or more links from one or more content sources remote to the computing device.

17. The system according to claim 16, wherein the operation of accessing the content entry from the content source comprises:
receiving a selection of a content type associated with the content entry;
receiving a selection of a content source associated with the content type;
receiving a selection of the content entry; and
returning the link to the content entry.

18. The system according to claim 17, wherein the operations further comprise:
storing the content entry in the database or on the computing device; and
returning the link to the content entry stored in the database or on the computing device.

19. The system according to claim 16, wherein the operation of accessing the content entry from the content source comprises:
navigating to a web page in a web browser;
executing share functionality of the web browser in connection with the web page;
receiving a selection of a content application in connection with the share functionality; and
sharing a link associated with the web page with the content application, the link associated with the web page as shared being the link to the content entry.

20. The system according to claim 16, wherein the operation of receiving the selection of the content entry associated with the content source comprises:
receiving a selection of a content type associated with the content entry;
receiving a link associated with a web page; and
returning the link associated with the web page, the link associated with the web page as returned being the link to the content entry.

21. The system according to claim 16, wherein the operations further comprise receiving at least one of a type, a title, and a description of a web page associated with a link as returned or shared with the content application, the link as returned or shared being the link to the content entry.

22. The system according to claim 16, wherein the operations further comprise generating the storyline associated with links to the content entries.

23. The system according to claim 22, wherein the operation of generating the storyline associated with the links to the content entries comprises:
receiving a selection of an address book content type from a plurality of content types;
receiving a selected contact from a plurality of contacts associated with the address book content type;
retrieving from the database one or more links to respective content entries associated with each of at least one other content type from the plurality of content types, the links of the respective content entries related to the selected contact; and
generating the storyline for the selected contact, the storyline including the one or more links to the respective content entries associated with each of the at least one other content type as retrieved, the respective content entries being accessible via the one or more links from one or more content sources remote to the computing device.

24. The system according to claim 23, wherein the respective content entries include one or more of webpages, music, videos, files, social networking services (SNS) posts, really simple syndication (RSS) feeds, photos, notes, emails, direct messaging (DM) messages.

25. The system according to claim 22, wherein the operation of generating the storyline associated with the links to the content entries comprises:
receiving a search term;
retrieving from the database one or more links to respective content entries associated with each of at least one content type, each of the respective content entries being associated with at least one of the tag, the memo, the contact, a link, or other textual data that includes the search term; and
generating the storyline for the search term, the storyline including the one or more links to the respective content entries associated with each of at least one content type, the respective content entries being accessible via the one or more links from one or more content sources remote to the computing device.

26. The system according to claim 22, wherein the operation of generating the storyline associated with the links to the content entries comprises:
receiving a selected tag;
retrieving from the database one or more links to respective content entries associated with each of at least one content type from a plurality of content types, the links of the respective content entries being associated with the selected tag; and
generating the storyline for the selected tag, the storyline including the one or more links to the respective content entries associated with each of the at least one content type as retrieved, the respective content entries being accessible via the one or more links from one or more content sources remote to the computing device.

27. The system according to claim 22, wherein the operation of generating the storyline includes a summation including a number of one or more content entries associated with each of at least one content type as retrieved in connection with the storyline, wherein the storyline is generated based on a selected contact, a selected search term, or a selected tag.

28. The system according to claim 16, wherein the operations further comprise sharing the content entry with a contact of a second computing device.

29. The system according to claim 28, wherein the operation of sharing the content entry with the contact of the second computing device comprises:
generating a second record associated with the second mobile device in the database;
copying the link to the content entry to the second record, including the at least one of the tag, the memo, or the contact in association with the link; and
notifying the contact of the second computing device that the content entry was shared, wherein the second computing device is capable of displaying the content entry represented by the link and the at least one of the tag, the memo, or the contact.

30. The system according to claim 28, wherein the operation of sharing the content entry with the contact of the second computing device comprises:
copying the content entry including the at least one of the tag, the memo, or the contact in association with the content entry to the second computing device;
posting the at least one of the tag, the memo, or the contact in association with a second link to the content entry as copied, as a record associated with the second computing device in the second database; and notifying the contact of the second computing device that the content entry was shared from a contact of the first computing device, wherein the second computing device is capable of displaying the content entry as copied represented by the second link and the at least one of the tag, the memo, or the contact.

\* \* \* \* \*